(12) United States Patent  (10) Patent No.: US 6,193,187 B1
Scott et al.  (45) Date of Patent: Feb. 27, 2001

(54) PAYLOAD CARRY AND LAUNCH SYSTEM

(76) Inventors: Harry Scott, 5546 W. 122nd St., Hawthorn, CA (US) 90250; Stephen G. Wurst, 4140 Derby Cir., Lancaster, CA (US) 93536

( * ) Notice: Subject to any disclaimer, the term of this patent is extended or adjusted under 35 U.S.C. 154(b) by 0 days.

(21) Appl. No.: 09/224,190

(22) Filed: Dec. 31, 1998

(51) Int. Cl.$^7$ .................................................. B64G 1/14
(52) U.S. Cl. ........................ 244/2; 244/158 R; 244/160; 244/172
(58) Field of Search ................................. 244/158 R, 2, 244/36, 73 R, 74, 160, 161, 172, 63, 137.4, 129.4

(56) References Cited

U.S. PATENT DOCUMENTS

| | | | |
|---|---|---|---|
| 3,161,379 | * 12/1964 | Lane | 244/36 |
| 3,211,401 | * 10/1965 | Denning et al. | 244/36 |
| 3,702,688 | 11/1972 | Faget | 244/162 |
| 4,265,416 | 5/1981 | Jackson et al. | 244/2 |
| 4,451,017 | 5/1984 | Marshall | 244/172 |
| 4,557,444 | 12/1985 | Jackson et al. | 244/172 |
| 4,709,883 | 12/1987 | Giuliani | 244/63 |
| 4,724,738 | 2/1988 | Johnson | 89/1.809 |
| 4,802,639 | 2/1989 | Hardy et al. | 244/2 |
| 5,090,642 | 2/1992 | Salkeld | 244/158 R |
| 5,141,181 | 8/1992 | Leonard | 244/172 |
| 5,402,965 | 4/1995 | Cervisi et al. | 244/2 |
| 5,568,901 | 10/1996 | Stiennon | 244/63 |
| 5,740,985 | 4/1998 | Scott et al. | 244/2 |
| 5,743,492 | * 4/1998 | Chan et al. | 244/158 R |

* cited by examiner

*Primary Examiner*—Galen L. Barefoot
(74) *Attorney, Agent, or Firm*—Dennis W. Beech

(57) ABSTRACT

The reusable space launch system has a first stage vehicle or aerospacecraft, a second stage vehicle or reusable spacecraft and a third stage vehicle or reusable orbit transfercraft. All the stages have the basic aerodynamic vehicle elements of a fuselage, wings, and tail, with the incorporation of control surfaces to supply lift, stability and control. The aerospacecraft is configured to use ejector ramjet engines for powered flight and includes equipment to capture air to supplement oxidizer for the ejector ramjet engine during take-off and extreme high altitude In order to optimize aerospacecraft performance in a pull up movement to exit the sensible atmosphere, the aerospacecraft may include auxiliary ascent rocket engines. The aerospacecraft payload bay is accessed by nose load re-closable payload fairings. The reusable spacecraft is mounted on tracks on each lower side of the aerospacecraft payload bay. For staging, a catapult ejects the reusable spacecraft and its payload through the opened payload fairings The aerospacecraft closes the payload fairings, re-enters the atmosphere, flies back to the operating base and lands for reuse. After ejection from the aerospacecraft, the reusable spacecraft and reusable orbit transfercraft may unfold their airfoils.

8 Claims, 17 Drawing Sheets

PAYLOAD CARRY AND LAUNCH SYSTEM

BACKGROUND OF THE INVENTION

1. Field of the Invention

This invention relates to vehicles used to place payloads such as satellites in earth orbit. The new vehicle normally uses two or three stages comprised of an ejector ramjet powered aerospacecraft, a second stage rocket powered reusable spacecraft to place payloads in low and medium earth orbit, and if necessary a third stage rocket powered reusable orbit transfercraft to place payloads in geosynchronous transfer orbit. The aerospacecraft may also be used with a combination of reusable and expendable upper stages, or all expendable upper stages, including a fourth stage, to place payloads in geosynchronous or planetary orbits. The aerospacecraft may also be used to carry payloads as a hypersonic aircraft.

2. Description of Related Art

There are currently in use various vehicles for placing satellites in earth orbit. These vehicles usually involve a rocket or missile or an aircraft and rocket combination. Such vehicles are well known and are manufactured in the United States as well as other countries. Numerous examples exist such as the Space Shuttle of the United States, the Ariane of France, the Proton of Russia and the like. The concept of the use of existing high altitude aircraft using rockets or missiles for launch from the aircraft has been disclosed and prototypes tested. Also, various designs for large horizontal take off initial lift vehicles have been proposed as exemplified by U.S. Pat. Nos. 4,802,639 and 5,402,965.

However, the use of an ejector ramjet powered aerodynamic vehicle with flight characteristics designed for horizontal take off or for launch from a larger aircraft has not been utilized for space launch of orbital payloads. One such system is disclosed in U.S. Pat. No. 5,740,985.

The present invention provides an aerodynamic vehicle optimized for flight from zero to hypersonic velocity with the capability to pull up out of the sensible atmosphere with auxiliary ascent rocket engines. The aerodynamic vehicle, the aerospacecraft, flies to an altitude to allow orbital placement of the payload with the use of one or more rocket stages. The aerospacecraft and rocket stages each then return and land to be reused. The aerospacecraft may also be used to transport payload in its cargo bay in which case it would take off and fly to a destination location and land.

SUMMARY OF THE INVENTION

One object of the present invention is to provide an aerodynamic which for use in launch of earth orbit payloads another object of the present invention is to provide a fully reusable multi-stage launch system to place payloads in earth orbit. The multi-stage launch system is comprised of an ejector ramjet powered aerospacecraft first stage for all missions, a rocket powered reusable spacecraft second stage for medium and low earth orbit missions, and a rocket powered reusable orbit transfercraft for geosynchronous transfer orbit missions. Another object is to deliver human or human related payloads to low or medium earth orbits using a man rated aerospacecraft and reusable spacecraft. A further object is to support special missions using the aerospacecraft, reusable spacecraft, reusable orbit transfercraft, expendable second stage, expendable third stage and expendable fourth stage in various combinations to place payloads in earth or planetary orbits. An additional object is to use the capability of the aerospacecraft as a hypersonic aircraft to carry a payload between destinations.

In accordance with the description presented herein, other objectives of this invention will become apparent when the description and drawings are reviewed.

DESCRIPTION OF THE PREFERRED EMBODIMENT

The reusable space launch system embodiment has a first stage vehicle or aerospacecraft, a second stage vehicle or reusable spacecraft and a third stage vehicle or reusable orbit transfercraft. All the stages have the basic aerodynamic vehicle elements of a fuselage, wings, and tail, with the incorporation of control surfaces to supply lift, stability and control. The aerospacecraft is configured to use ejector ramjet engines for powered flight and includes equipment to capture air to supplement oxidizer for the ejector ramjet engine during take-off and extreme high altitude. In order to optimize aerospacecraft performance in a pull up movement to exit the sensible atmosphere, the aerospacecraft may include auxiliary ascent rocket engines. The aerospacecraft is supplemented with one or more stage vehicles to place satellites in selected orbits. Exo-atmospheric control of all stages is achieved with small rockets arranged and employed as required about all axis of flight. All vehicles may be flown with unmanned autonomous guidance, navigation and controls with remote pilot backup. The payload bay is accessed by nose load re-closable payload fairings. The reusable spacecraft is mounted in tracks on each lower side of the aerospacecraft payload bay. Steady rests on the ramp portion of the re-closable fairing supports the reusable spacecraft and reusable orbit transfercraft during carriage. For staging, a catapult ejects the reusable spacecraft and its payload through the opened payload fairings. The aerospacecraft closes the payload fairings, re-enters the atmosphere, flies back to the operating base and lands for reuse. After ejection from the aerospacecraft, the reusable spacecraft and reusable orbit transfercraft may unfold their airfoils.

The reusable spacecraft places its payload in low or medium earth orbit. The reusable spacecraft is powered by a rocket engine for flight. The payload is mounted on the front of the reusable spacecraft. After payload separation, the payload mount is rotated 180 degrees to the inside of the forebody and a spherical segment on the opposite side is now the aerodynamic fairing for recovery flight. The reusable spacecraft re-enters the atmosphere and glides to a landing at the operating base for reuse. For the primary mission of placing a satellite in geosynchronous transfer orbit, the reusable orbit transfercraft is used. The reusable orbit transfercraft is powered by a rocket engine for flight. The satellite is mounted on a structure on the front of the reusable orbit transfercraft within four opened doors. After separation, the doors are closed to provide an aerodynamic fairing for recovery flight. The reusable orbit transfercraft employs orbit multiple re-entries to minimize aerodynamic heating and obtaining cross range to glide to a landing at the operating base for reuse.

Figure 1:
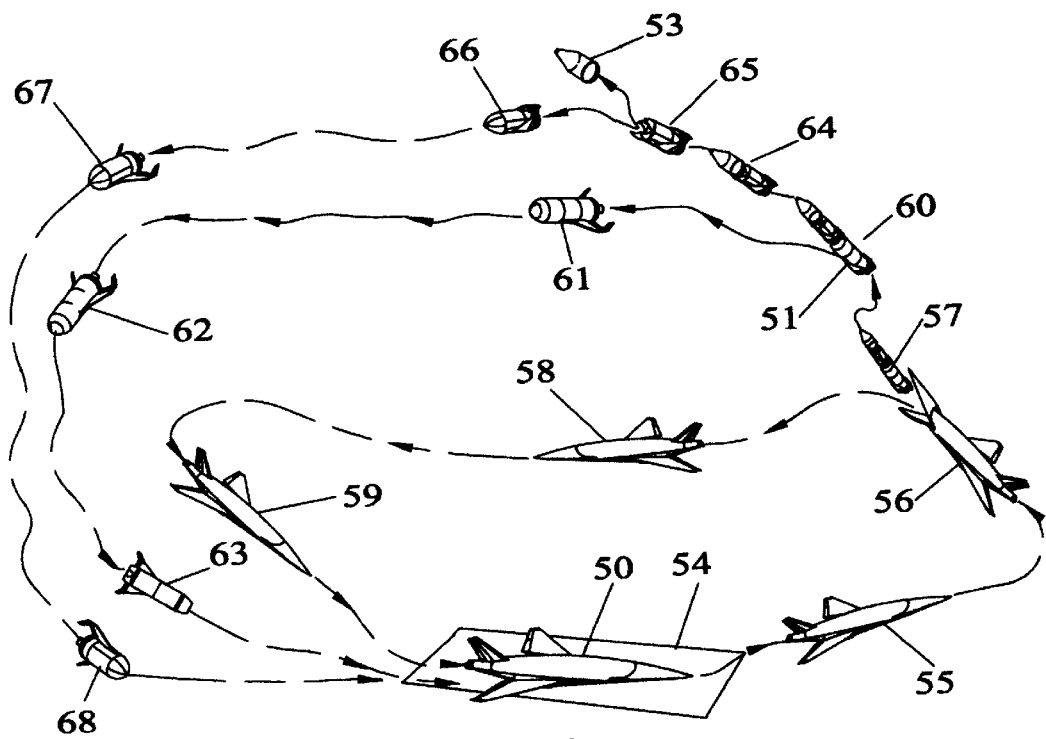
FIG. 1 illustrates the operational stages for a three stage mission flight operation.

Referring to FIG. 1, the schematic illustrates the preferred embodiment flight operations for a mission to place a satellite in geosynchronous transfer orbit. This mission determines the size of the launch system. The aerospacecraft (50) containing the reusable spacecraft (51), reusable orbit transfercraft (52) and a geosynchronous orbit satellite (53) takes off from a conventional runway (54) at an operating base using ejector ramjet propulsion and climbs while accelerating to mid-supersonic speed. During this flight segment the ejector in the ejector ramjet engine uses stored and captured air oxidizer at take-off, captured air oxidizer for acceleration and stores air oxidizer for later use. After ejector shutdown, the aerospacecraft (50) continues to accelerate to hypersonic speed (55). The aerospacecraft (50) executes a high altitude pull-up including relighting the ejector and employing boost ascent rocket propulsion to exit the sensible atmosphere (56). The reusable spacecraft (51), reusable orbit transfercraft (52), and satellite (53), are ejected by catapult from the aerospacecraft (50) for staging (57). The aerospacecraft (50) re-enters the atmosphere and flies back to the operating base on ramjet propulsion at high supersonic speed (58). The aerospacecraft (50) is recovered at the operating base (54) with a horizontal landing (59). The reusable spacecraft (51) boosts the reusable orbit transfercraft (52) with satellite (53) to low earth orbit (60). After delivery and separation, the reusable spacecraft re-enters the atmosphere (61) and de-orbits (62) and glides back to the operating base runway (54) for a horizontal landing recovery (63). The reusable orbit transfercraft (52) delivers the satellite (53) to geosynchronous orbit (64) and separates (65). The reusable orbit transfercraft (52) may de-orbit using more than one pass for aerodynamic braking to minimize aerodynamic heating (66) while simultaneously using this energy with the aerodynamic characteristics of the reusable orbit transfercraft (52) to arrive in gliding proximity to the operating base at point (67). The reusable orbit transfercraft (52) horizontally lands for recovery (68) at the operating base runway (54).

Figure 2:
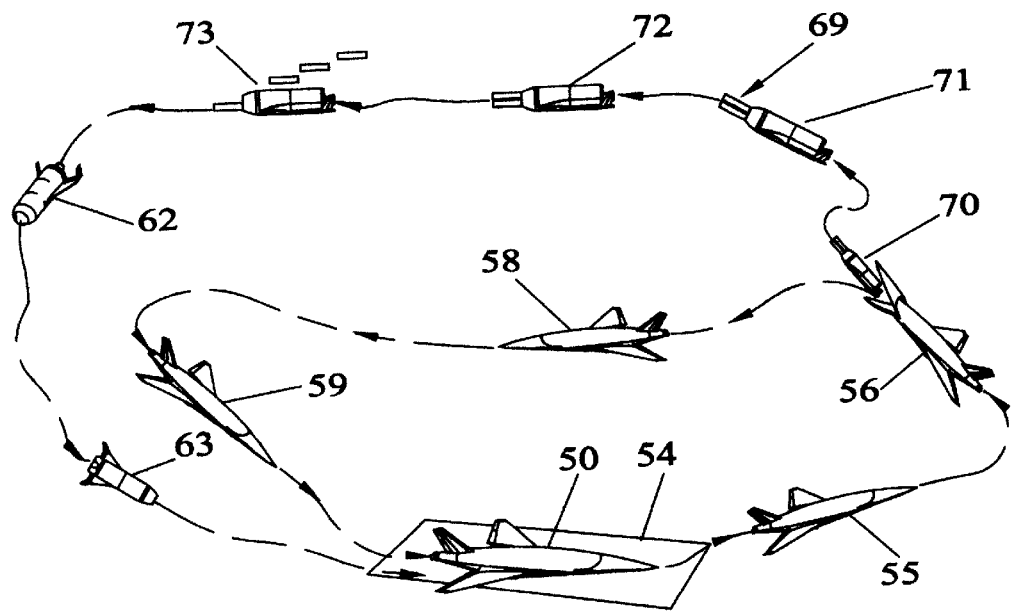
FIG. 2 illustrates another basic mission flight operations.

Referring to FIG. 2, the schematic illustrates other embodiment flight operation missions to place satellites in medium or low earth orbit. These missions are based on the inherent capability of using the aerospacecraft (50) and the reusable spacecraft (51) as a two stage system. The aerospacecraft (50) containing the reusable spacecraft (51) and one or more satellites (69) takes off from a conventional runway (54) at the operating base using ejector ramjet propulsion and climbs while accelerating to mid-supersonic speed. During this flight segment the ejector uses stored and captured air oxidizer at take-off, captured air oxidizer for acceleration and stores air oxidizer for later use. After ejector shutdown the aerospacecraft (50) continues to accelerate to hypersonic speed (55). The aerospacecraft (50) executes a high altitude pull-up including relighting the ejector and employing boost ascent rocket propulsion to exit the sensible atmosphere (56). The reusable spacecraft (51) and satellites (69) are ejected by catapult from the aerospacecraft (50) for staging (70). The aerospacecraft (50)

re-enters the atmosphere and flies back to the operating base on ramjet propulsion at high supersonic speed (58). The aerospacecraft (50) is recovered at the operating base (54) with a horizontal landing (59).

The reusable spacecraft (51) boosts the satellites (69) to the desired altitude (71), circularizes the orbit (72) and dispenses the satellites (73). The reusable spacecraft (51) de-orbits (62) and glides back for horizontal landing recovery (63) to the operating base runway (54).

Figure 3:
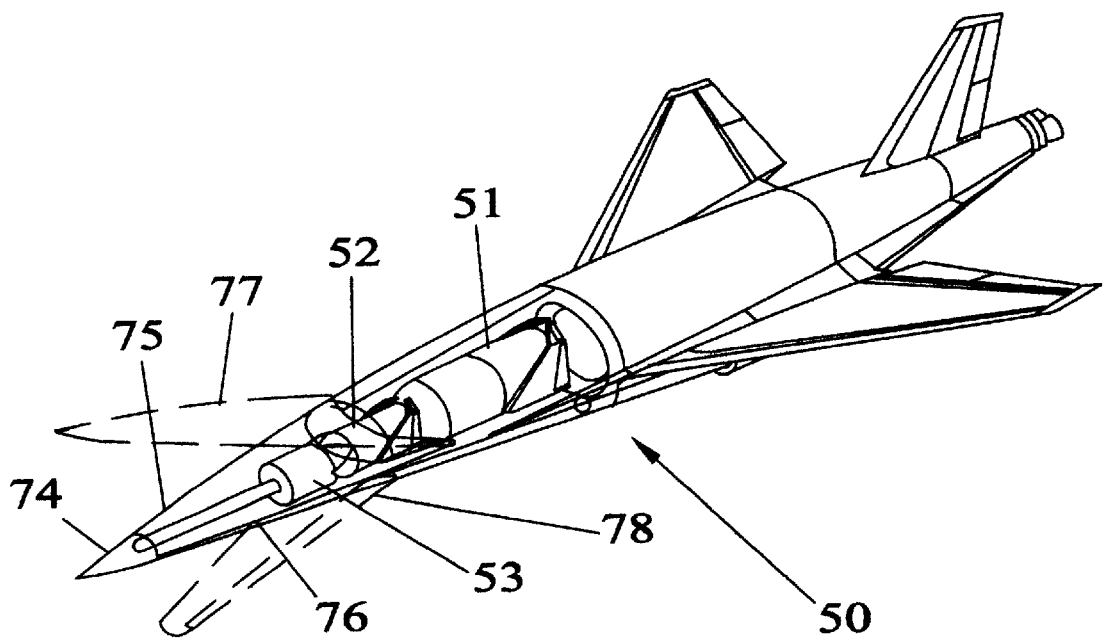
FIG. 3 illustrates the launch system vehicles in a partially ghosted perspective view showing a three stage mission arrangement during carriage by the aerospacecraft of the internally mounted reusable spacecraft, reusable orbit transfercraft, and a payload clearance envelope.
Figure 4:
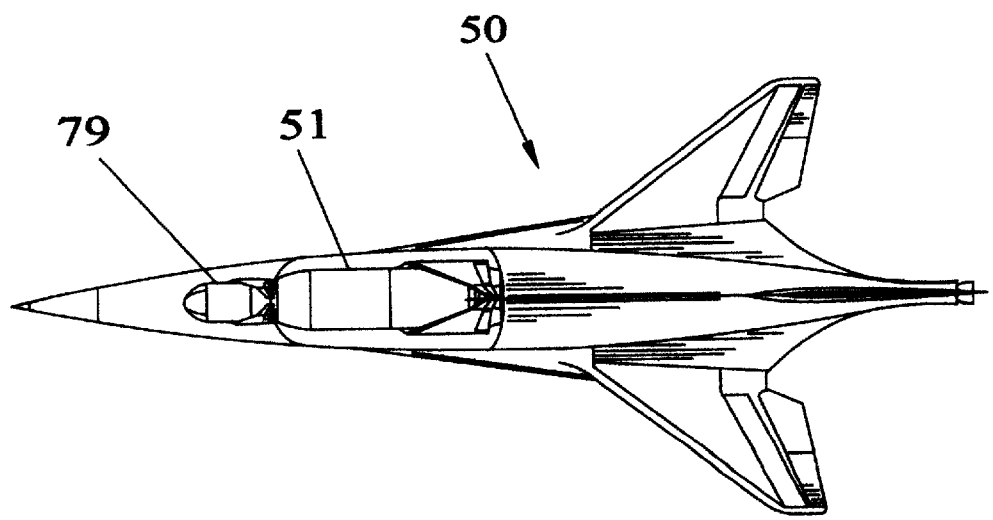
FIG. 4 illustrates a top partial cut away view of the aerospacecraft with the internal arrangement in planform of a mission to deliver human or human related payloads to low or medium earth orbit.

Referring to FIG. 3, the partially ghosted perspective illustrates the carriage by the aerospacecraft (50) of the preferred embodiment mission vehicles, the reusable spacecraft (51), the reusable orbit transfercraft (52) and a phantom lined envelope of a geosynchronous orbit satellite (53). The reusable spacecraft (51) and reusable orbit transfercraft (52) have their airfoils folded against their fuselages. The reusable spacecraft (51) has the reusable orbit transfercraft (52) mounted on its nose and the reusable orbit transfercraft (52) has the satellite (53) mounted inside its opened forward doors. These vehicles are accessed through re-closable nose fairings (74) consisting of an upper hood (75) and lower ramp (76). In phantom lines the hood (75) is shown open (77) and the ramp (76) is shown open (78).

Figure 5:
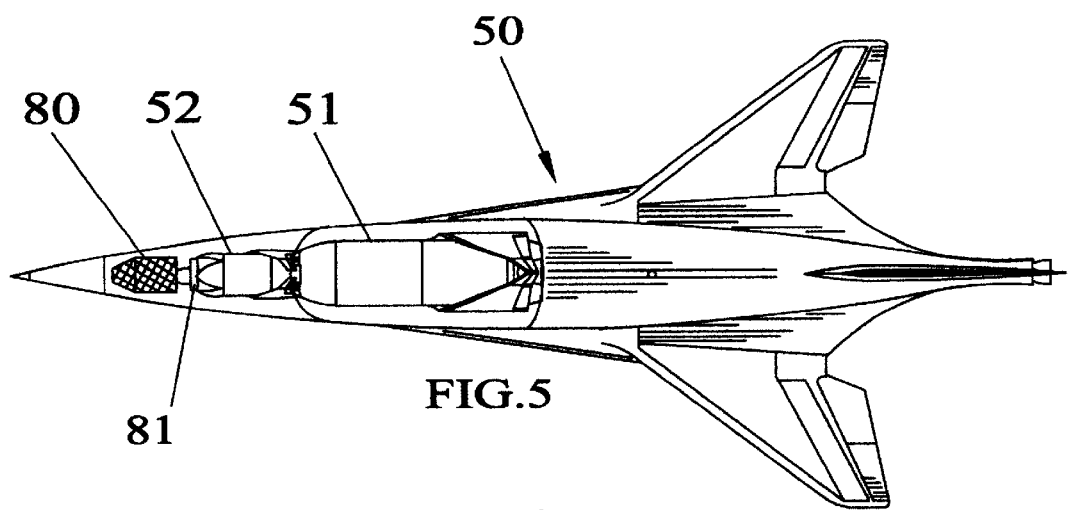
FIG. 5 illustrates a top partial cut away view of the aerospacecraft with the internal arrangement in planform of a mission requiring an expendable fourth stage to deliver a payload beyond earth orbit.
Figure 6:
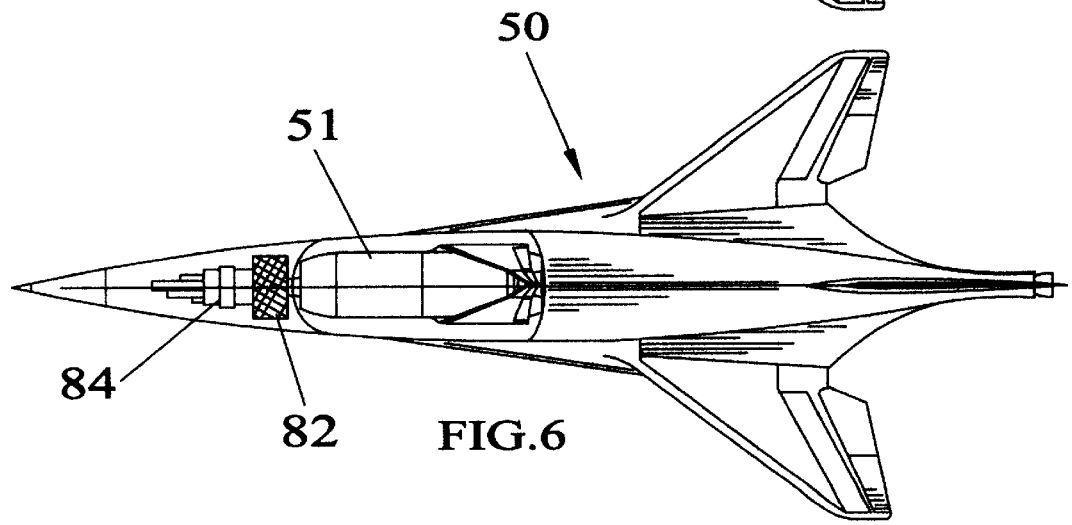
FIG. 6 illustrates a top partial cut away view of the aerospacecraft with the internal arrangement in planform of a mission requiring an expendable third stage to deliver an overweight payload to low or medium earth orbit.
Figure 7:
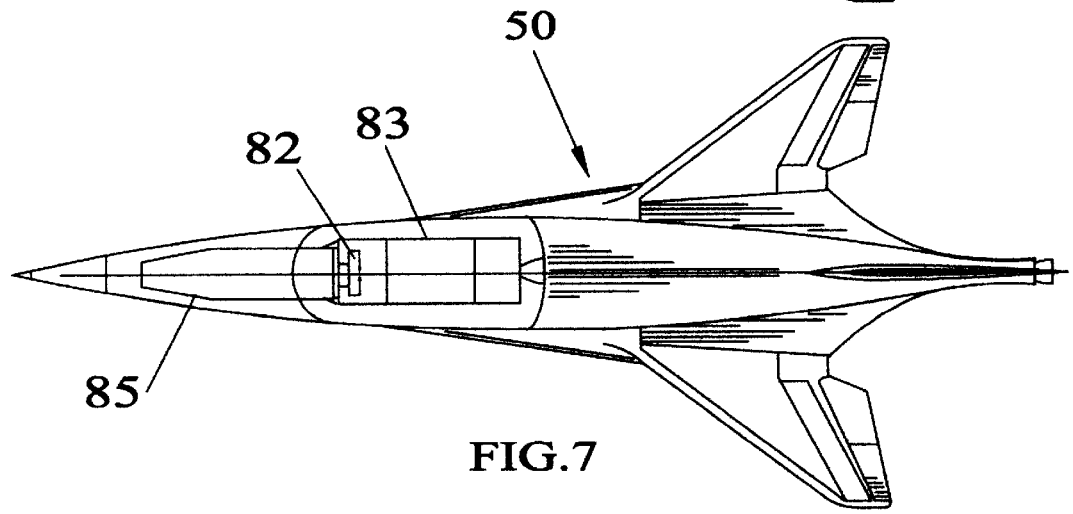
FIG. 7 illustrates a top partial cut away view of the aerospacecraft with the internal arrangement in planform of a mission requiring expendable second and third stages to deliver a payload to geosynchronous orbit or a very heavy payload to low or medium earth orbit.

Referring to FIGS. 4 through 7, the aerospacecraft (50) has the capability of launching a multitude of payloads using various combinations of reusable and expendable upper stages. A vehicle designed to deliver human or human related payload (79) to low or medium earth orbit is shown mounted on a reusable spacecraft (51) in FIG. 4. Interplanetary exploration vehicles (80) may be launched with the addition of an expendable fourth stage (81) to the reusable orbit transfercraft (52) and reusable spacecraft (51) in the aerospacecraft (50) as shown in FIG. 5. FIG. 6 illustrates a special case of a large mass satellite (84) which may be placed in earth orbit using the aerospacecraft (50), the reusable spacecraft (51) and an expendable third stage (82). The expendable third stage (82) replaces reusable features of the reusable orbit transfercraft (52) with an equivalent mass of propellant and tankage for additional boost capability. FIG. 7 illustrates a special case of a large mass satellite (85) which may be placed directly in geosynchronous earth orbit using the aerospacecraft (50), an expendable second stage (83) and an expendable third stage (82). The expendable second stage (83) also replaces reusable features of the reusable spacecraft (51) with equivalent mass of propellant and tankage for additional boost capability.

Figure 8:
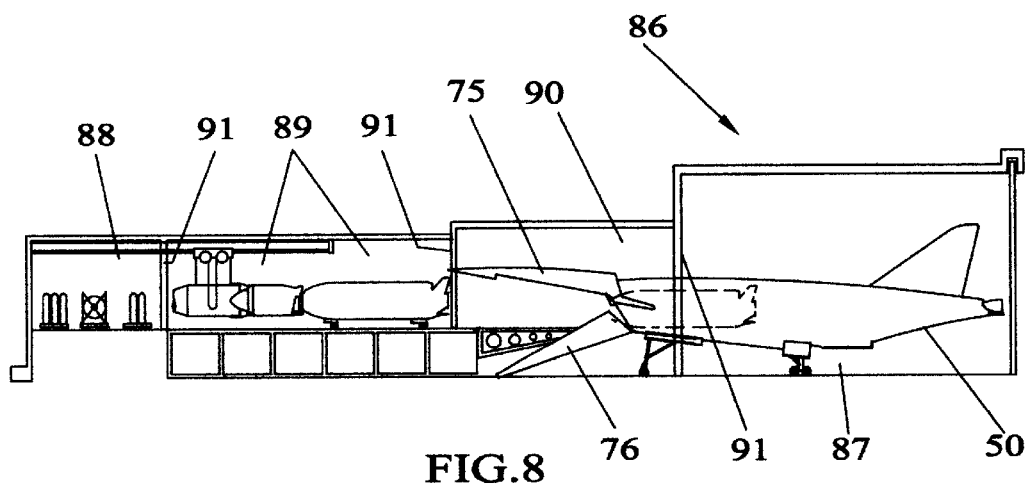
FIG. 8 illustrates a side elevation of the payload processing for flight installation.
Figure 9:
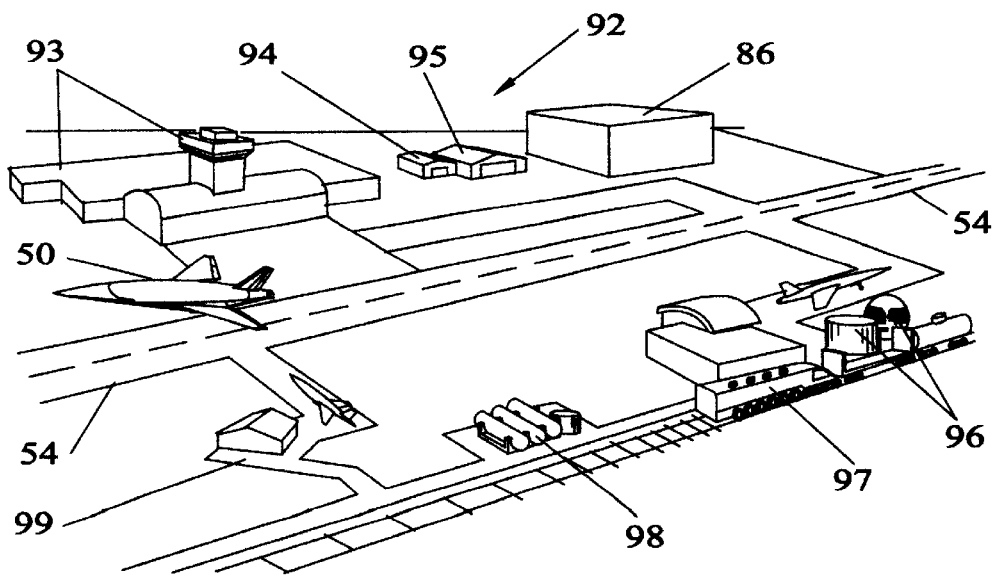
FIG. 9 illustrates a perspective view of a conceptual system operating base elements and facilities.

Referring to FIGS. 8 and 9, reusable space launch system facilities are illustrated. FIG. 8 is a side elevation of the payload processing facility (86) which includes a series of clean rooms and a maintenance and service room (87) for the aerospacecraft (50). The clean rooms are for satellite preparation (88), for mounting on the upper stages (89) and for installation in the aerospacecraft (90). Each clean room is isolated by sealed doors (91). After the satellite or satellites are processed through preparations and mounting on an upper stage and the assembly then installed in the aerospacecraft, (50), the upper hood (75) and lower ramp (76) of the reclosable nose fairing is shut and sealed. The loaded aerospacecraft (50) is then towed out of the payload processing facility (86) to the propellant service site (96) which is included in FIG. 9 operating base (92). The payload processing facility (86) also serves as the aerospacecraft maintenance hangar. Other elements of the operating base include the flight operations management, administration and engineering support building (93), the reusable orbit transfercraft maintenance hangar (94), the reusable spacecraft maintenance hangar (95), propellant service site (96), propellant re-supply transport access (97), engine test site (98), vehicle run-up site (99) and runway (54) for aerospacecraft (50) take-off and landing of all vehicles for recovery.

Figure 10:
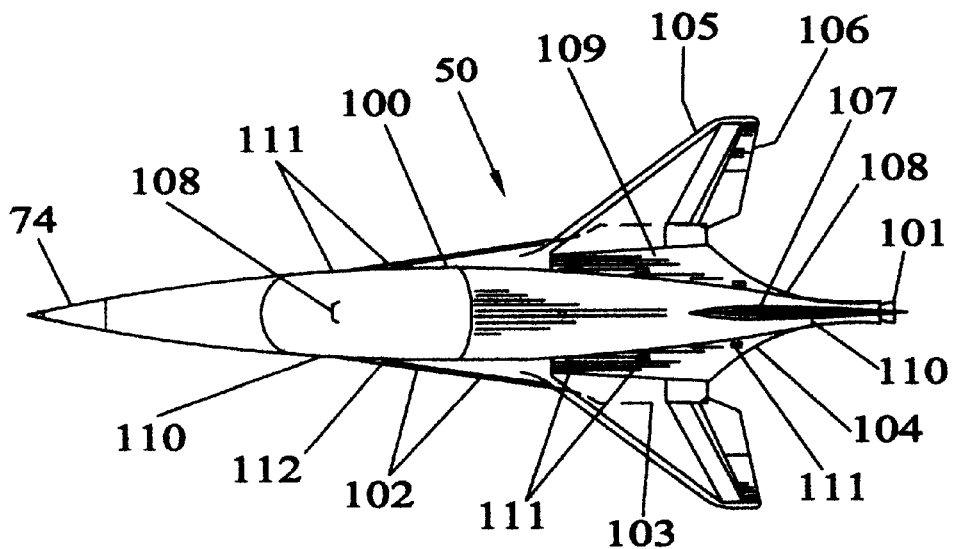
FIG. 10 illustrates the top planform view of the aerospacecraft.

Referring to FIG. 10, the aerospacecraft (50) is shown in a top planform view with the re-closable payload nose fairing (74) forming the forebody. The ojival upper fuselage (100) blends aftward into the auxiliary ascent rocket engines cowl (101). The lower forward fuselage (102) expands aftward from the nose to the ejector ramjet nacelles (103). The lower aft fuselage (104) is shaped to be an extended nozzle of the ejector ramjet engines. The wings (105) are swept aft and tapered with a root notch for the ejector ramjet nozzle and trailing edge elevons (106) for aerodynamic pitch and roll control. The vertical tail (107) provides directional stability. Exo-atmospheric attitude is controlled by thrusters for pitch (108), roll (109) and yaw (110). The airframe internal pressure, excluding propellant systems, is controlled by vents (111). The payload ejection catapult gases are symmetrically exhausted ports (112).

Figure 11:
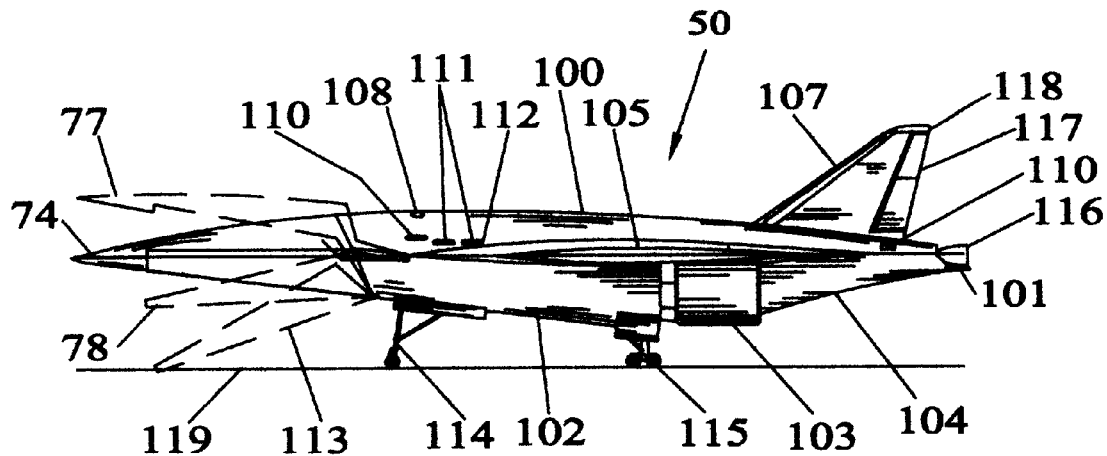
FIG. 11 illustrates the side elevation view of the aerospacecraft.

Referring to FIG. 11, the aerospacecraft (50) is shown in side elevation view with re-closable payload nose fairing (74) shown closed in solid lines, in the payload ejection position the hood open (77) and ramp open (78) are shown in phantom lines and in the ground payload installation the ramp open (113) is lowered further. The auxiliary landing gear (114) and main landing gear (115) are shown in the extended position for ground handling, take-off and landing. Under the wing (105) are the ejector ramjet nacelles (103) that also include the air induction system for the ejector ramjet engine and oxidizer supplementation device, the air liquefaction units. The lower forward fuselage (102) or forebody expanding cross section provides pre-compression of the air entering the air induction system at high speeds. The lower aft fuselage (104) is shaped to be an extended nozzle of the ejector ramjet engines. The lower portion of the auxiliary ascent rocket engines cowl (101) is a re-entry heat shield. The boost ascent rocket engines (116) nozzles remain exposed to radiate their heat during operation. The vertical tail (107) trailing edge rudder (117) provides aerodynamic directional control. The fuel vent (118) is in the trailing edge tip of the vertical tail (107). Shown on various parts of the upper fuselage (100) are the attitude control thrusters for pitch (108) and yaw (110), airframe vents (111) and ejection catapult exhaust port (112). The aerospacecraft (50) is shown standing on the static ground line (119).

Figure 12:
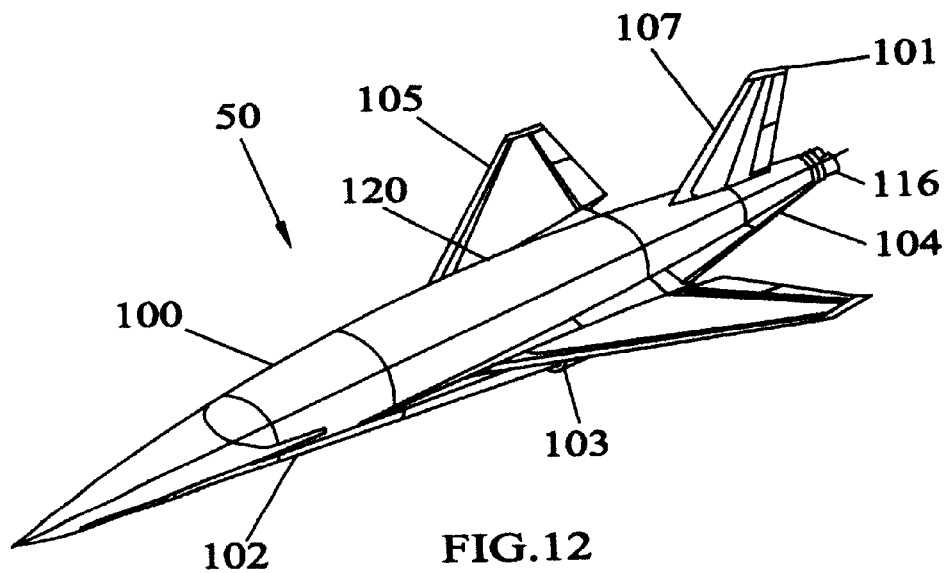
FIG. 12 illustrates the top perspective view features of the aerospacecraft.

Referring to FIG. 12, the external configuration features a high fineness ratio low drag upper fuselage (100) of ojival form. The aft portion fuselage (120) above the wing (105) contracts to blend with the auxiliary ascent rocket engine cowl (101) and the lower forward fuselage (102) expands from the nose to the ejector ramjet nacelle (103) below the wing (105) to produce compression lift at high speeds. During ejector ramjet operation fuel may be injected in the area of the lower aft fuselage (104) along with turbopump exhaust to fill the nozzle to reduce drag and generate external burning thrust. After the ejector is shut down at high speed and altitude the ramjet and turbopump exhaust fills the nozzle and produces thrust. The wing (105) and vertical tail (107) have thin airfoil sections and high aspect ratios, for a hypersonic vehicle, for low drag over the entire flight envelope. The auxiliary ascent rocket engines (116) may be ignited after re-igniting the ejectors of the ramjet and continue to fire after the ejector ramjet is shut down to accelerate the aerospacecraft (50) out of the sensible atmosphere to the altitude of upper stage ejection.

Figure 13:
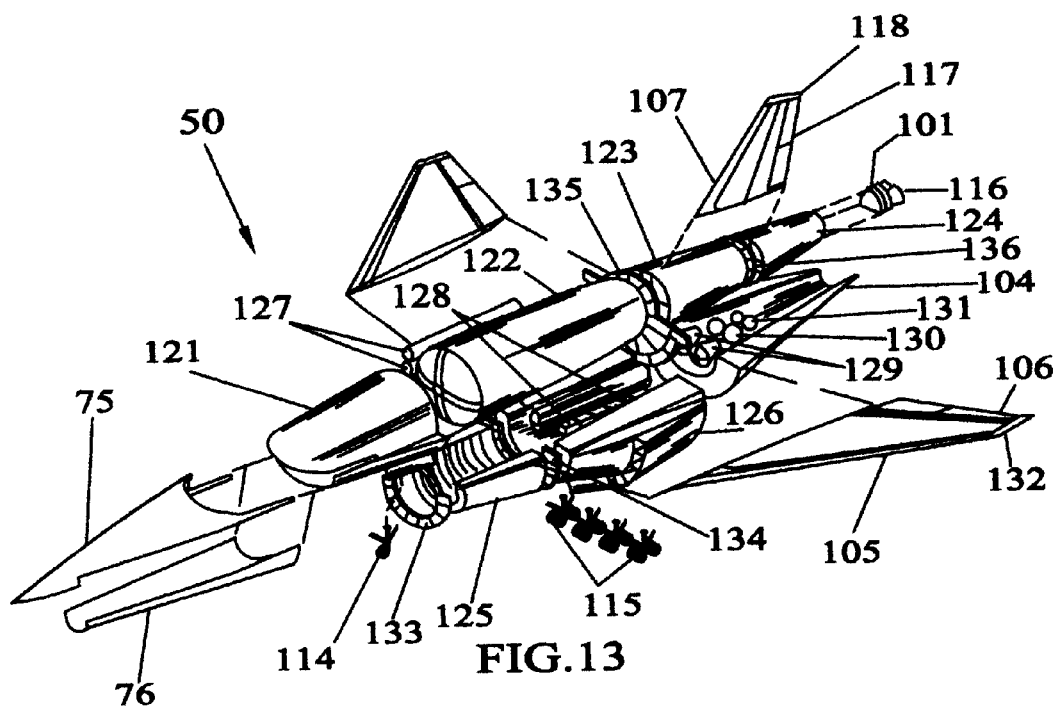
FIG. 13 illustrates an exploded view of the major components of the aerospacecraft.

Referring to FIG. 13, the aerospacecraft (50) major components are illustrated in an exploded perspective view and include: the hood (75) and ramp (76) of the re-closable payload fairing (74); the forward fuselage (121) which contains the cargo bay, the payload ejection catapult system, auxiliary landing gear (114), avionics and environmental control system, electric driven hydraulic system, forward pitch and yaw attitude control system (108) (110), airframe vents (111) and a propellant delivery, dump and vent system for on board service of the upper stages with quick disconnect; the main ascent fuel tank (122); the auxiliary ascent rocket fuel tank (123) and oxidizer tank (124); auxiliary ascent rocket cowl (101) and engines (116); return cradle fuel tank (125); lower intermediate fuselage (126) with ejector ramjet nacelles (103) containing ejector ramjet engines and air induction system, main landing gear (115), auxiliary ascent fuel tanks (127), air liquification units (128), propellant delivery, dump and vent systems, roll attitude control system (109), and airframe vents; lower aft fuselage (104) containing ejector ramjet oxidizer storage tanks (129), propellant tanks pressurant tanks (130), primary internal power units and propellant tanks (131), aft pitch and yaw attitude control system (108) (110), and airframe vents (111); wings (105) and elevons (106) containing flight control actuators, oxidizer vents (132) and airframe vents between the wing and elevons; vertical tail (107) and rudder (117) containing flight control actuators, fuel vent (118) and airframe vents between the wing and elevons; vertical tail (107) and rudder (117) containing flight control actuators, fuel vent (118) and airframe vents between the vertical tail fin and rudder; auxiliary landing gear (114); main landing gear; forward major frame (133); lower intermediate frame (134); intermediate bulkhead (135); and aft bulkhead (136). All cryogenic propellant tanks use multi-layer insulation to minimize boil-off and prevent frost formation on external surfaces. The forward fuselage, main ascent fuel tank, auxiliary ascent rocket fuel and oxidizer tanks are the primary fuselage structure. The secondary structure; cradle tank, lower intermediate fuselage and lower aft fuselage transfer loads to the primary fuselage structure through the major frames and bulkheads as do the wings and vertical tail.

Figure 14:
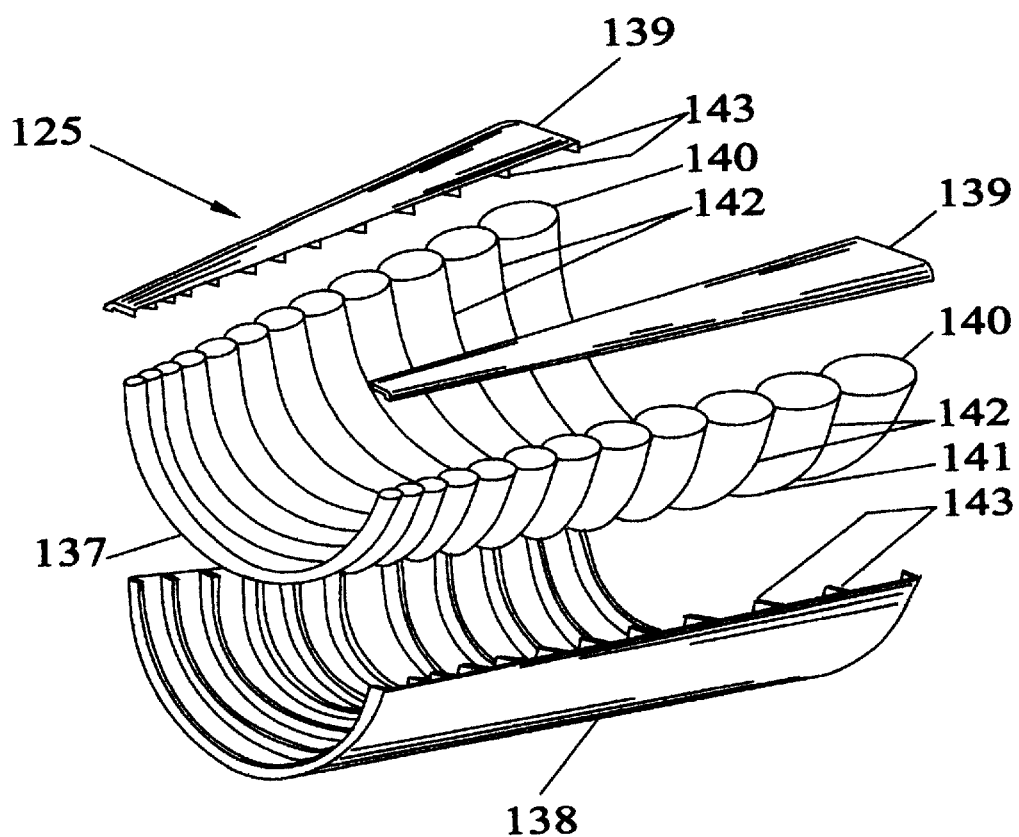
FIG. 14 illustrates a perspective view of the concentric multi-lobe cradle fuel tank and fairings.

Referring to FIG. 14, an exploded perspective view of the return cradle tank (125) illustrates the major components. The cradle tank (125) is composed of a tank (137), a cover (138) and caps (139). The tank (137) is a concentric multi-lobe design with oblate spheroid ends (140). The lobes (141) are of circular cross section with increasing radius from front to rear. The lobes (141) overlap and intersect at a node point (142). The inner and outer node points (142) are connected by a perforated web which is a structural tie and baffle. The tank (137) is mounted fore and aft to major frames (133) and (134) with thermal expansion compensating devices. The tank (137) contains fill, dump, vent and quantity measuring equipment. The tank (137) is aerodynamically faired with a half truncated conical cover (138) and caps (139). The cover (138) and caps (139) are of metallic sandwich construction stiffened with a series of concentric frames (143) that fit in tank (137) node points (142). The cover (138) and caps (139) are attached to the major frames (133) and (134). The caps (139) are also attached to the cover (138) along the common interface.

Figure 15:
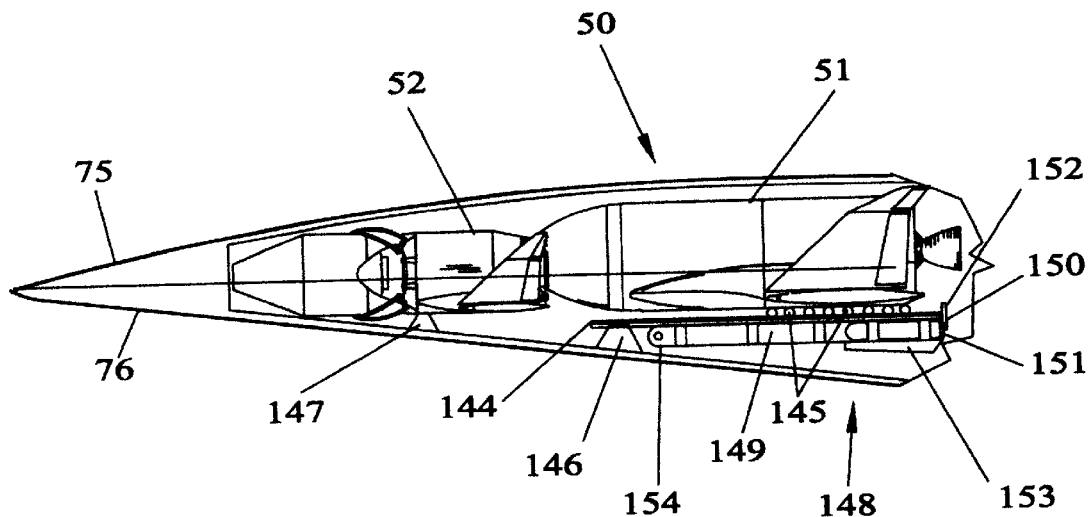
FIG. 15 illustrates a side elevation view of the aerospacecraft payload, support and catapult ejection system.

Referring to FIG. 15, the aerospacecraft (50) payload, support and catapult ejection system are illustrated in a side elevation of the forebody. The aerospacecraft (50) payload is installed in a pair of tracks (144) on each lower side of the cargo bay. The reusable spacecraft (51) has a plurality of rollers (145) in the wing root which are exposed by the folded wing. In addition, the reusable spacecraft (51) is supported by a post (146) mounted on the aerospacecraft (50) ramp (76), which when opened allows the post to clear the reusable spacecraft (51) during installation and ejection. For the primary mission, a more forward located post (147) on the ramp (76) supports the reusable orbit transfercraft (52) with the same clearing features. The catapult (148) is a high pressure cold gas actuated device composed of an integral trolley and cylinder (149), multiple telescoping pistons (150), airframe mount (151), lock and unlock mechanism (152), gas storage tanks with a fill, delivery and dump system (153). The trolley (149) has beam mounted rollers on each side and fore and aft which are installed in the tracks (144) behind the reusable spacecraft (51). The trolley (149) butts against a bumper on the reusable spacecraft (51) aft side of the wing carry through structure. The trolley (149) beams have lock mechanisms to restrain the reusable spacecraft (51) to the aerospacecraft (50) during carriage. The trolley (149) beams are connected by a fore and an aft cross beam which are joined to the centerline cylinder. The multiple telescoping pistons are collapsed within the trolley cylinder (149) during carriage. When the upper stages are to be ejected from the aerospacecraft (50) the hood (75) and ramp (76) are opened and the catapult activated. The innermost of multiple telescoping piston has an aft cap configured as a trunnion with side pins inserted in an aerospacecraft (50) fuselage fore to aft slotted mount (151) and held in place during carriage by a separate retaining pin through the trunnion and mount (151) lugs. The aerospacecraft (50) control system opens the valves to allow the cold gas to flow from the storage tanks (153) to the cylinder (149) whereas the retaining pin is sheared as the piston (150) starts to expand and the trunnion side pins move aft in the aerospacecraft (50) fuselage mount (151). The carriage restraint mechanism (152) is unlocked as the trunnion side pins move aft and actuate the mechanism (152) by contacting a mount (151) striker plate. When the trunnion side pins seat against the aft part of the slots in the mount (151) the telescoping pistons (150) expand driving the trolley (149) forward to eject the reusable spacecraft (51) and its payload out of the aerospacecraft (50). The catapult (148) stops pushing while the reusable spacecraft (51) has a sufficient number of its rollers engaged in the tracks to null the adverse pitch up moment induced by the low thrust line to reusable spacecraft (51) center of gravity difference. Each piston (150) head has dynamic seals within the cylinder and all but the innermost piston acts as a cylinder to its piston within and has dynamic seals in its bushings that support the piston rods. The sealing of the volume during assembly between the pistons and bushings provide a buffer at the end of the trolley (154) stroke when the cold gas source is shut off and the cylinder (149) gas pressure is rapidly reduced to 15 pounds per square inch absolute. The dumped gas is exhausted symmetrically out each side of the aerospacecraft (50) fuselage. The catapult (148) is reset during ground turn-around for the following mission.

Figure 16:
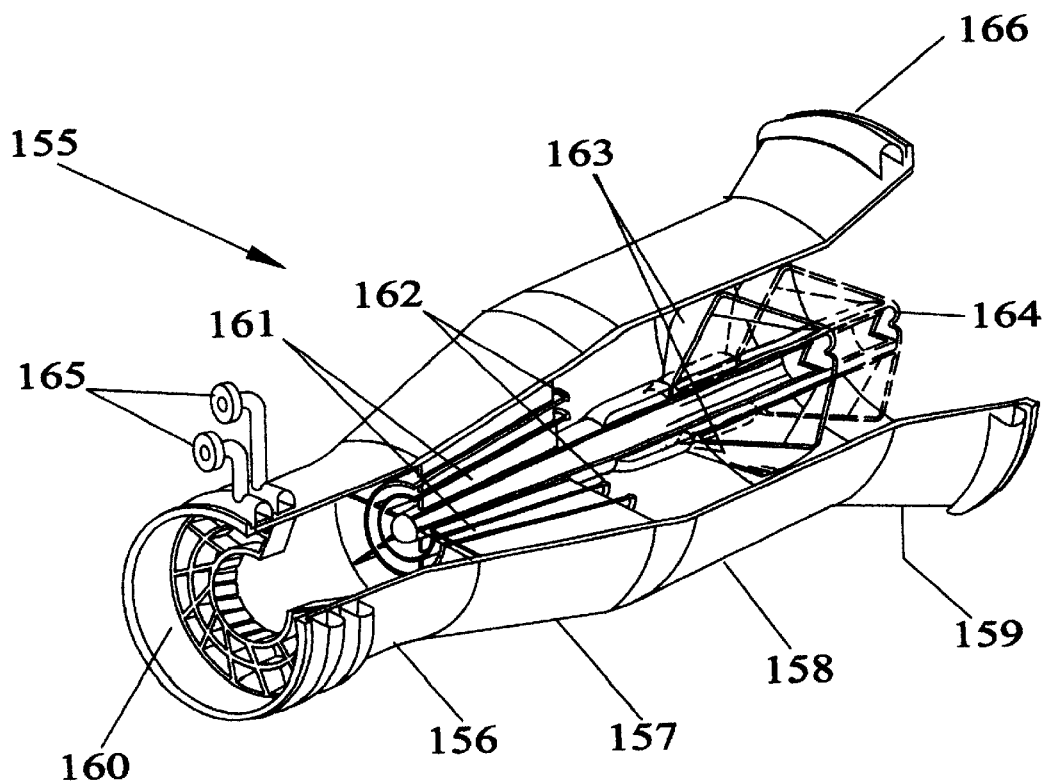
FIG. 16 illustrates a perspective view of the ejector ramjet engine flowpath.

Referring to FIG. 16, a cut-away top perspective view illustrates the ejector ramjet engine (155) flowpath. The external sections are the mixer (156), the diffuser (157), the combustor (158) and the nozzle (159). The internal components are the ejector (160), diffusor vanes (161), fuel injectors (162), nozzle plug closed (163), nozzle plug open (164), and a nozzle plug telescoping shaft. Also shown are the ejector power feed manifold (165) and nozzle regenerative cooled manifold (166). The nozzle plug (163) is regenerative cooled.

Figure 17:
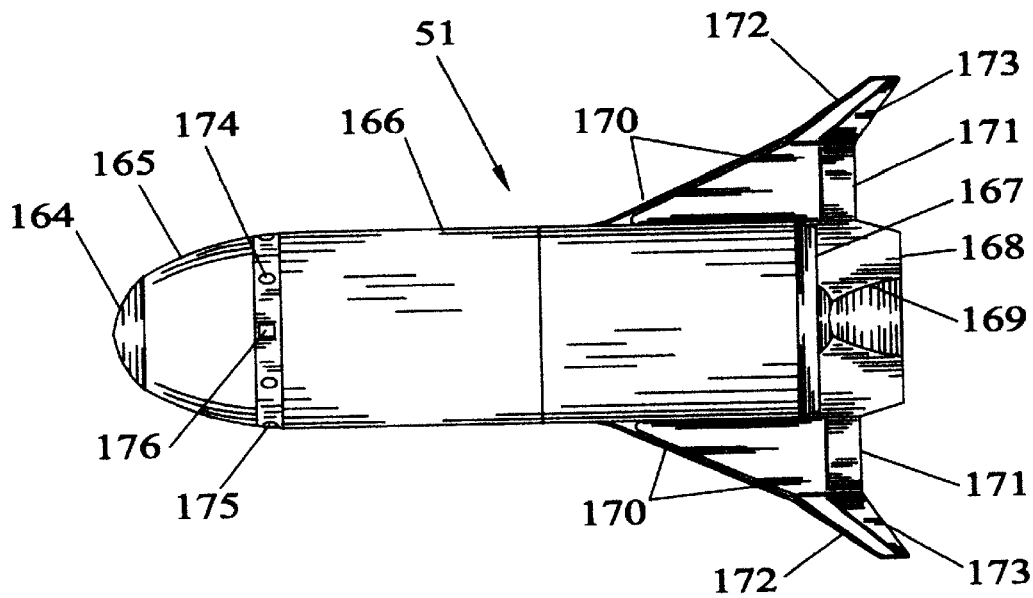
FIG. 17 illustrates a top planform view of the reusable spacecraft.

Referring to FIG. 17, the reusable spacecraft (51) is shown in a top planform view in the recovery configuration. The spherical segment (164) of the payload mount is facing forward and fairs into the ojival forebody (165) which fairs into the main fuselage (166). The aft fuselage closeout (167) is a heat shield protecting the internal systems during re-entry. The lower panel is a heat shield (168) for the rocket engine (169) nozzle. The wings (170) are highly swept aft with trailing edge elevons (171) for aerodynamic pitch and roll control. A slanted vertical tail (172) is mounted on each wing (170) tip. The dihedral angle of the slanted vertical tail (172) is set to maximize wing (170) and slanted vertical tail (172) areas while minimizing carriage volume in the aerospacecraft (50). The vertical tails (172) provide directional stability and trailing edge rudders (173) provide directional control. Exo-atmospheric attitude is controlled by thrusters for pitch and roll (174) and yaw (175). The airframe internal pressure, excluding propellant systems, is controlled by vents (176).

Figure 18:
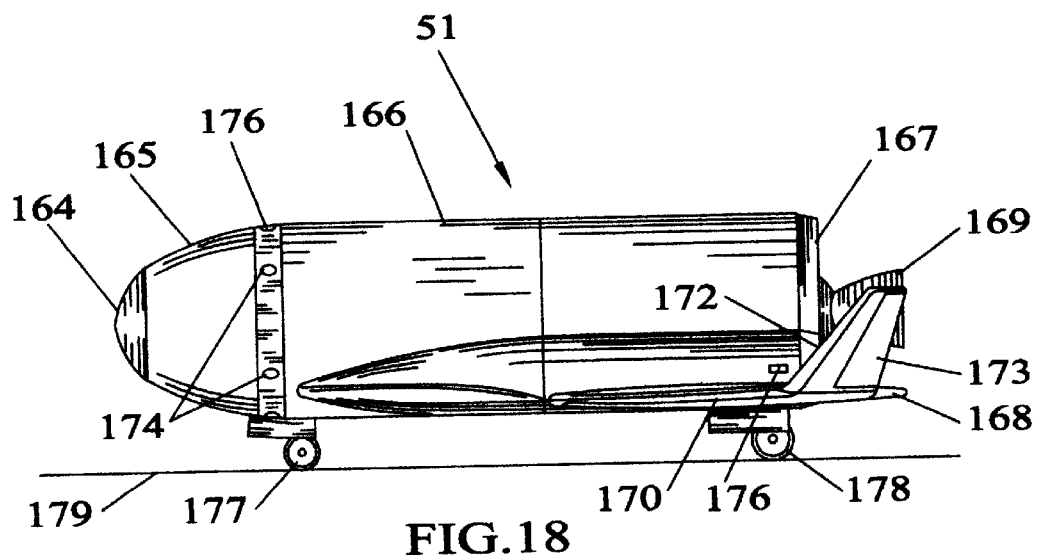
FIG. 18 illustrates a side elevation view of the reusable spacecraft.

Referring to FIG. 18, the reusable spacecraft (51) is shown in a side elevation view in the recovery configuration. The auxiliary landing gear (177) and main landing gear (178) are shown in the extended position for ground handling and landing. The reusable spacecraft (51) is shown standing on the static ground line (179). The fairing (180) on the lower fuselage (166) sides house the wing attachment structure and extension and lock mechanisms, main landing gear (178) and rollers (145) for installation in the aerospacecraft (50). Shown on the forebody (165) are the attitude control thrusters (174) and (175) and vent (176), also in the fairing (180). Also shown are the spherical segment (164) fairing, closeout (167) heat shield (168), rocket engine (169), wing (170), vertical tail (172) and rudder (173).

Figure 19:
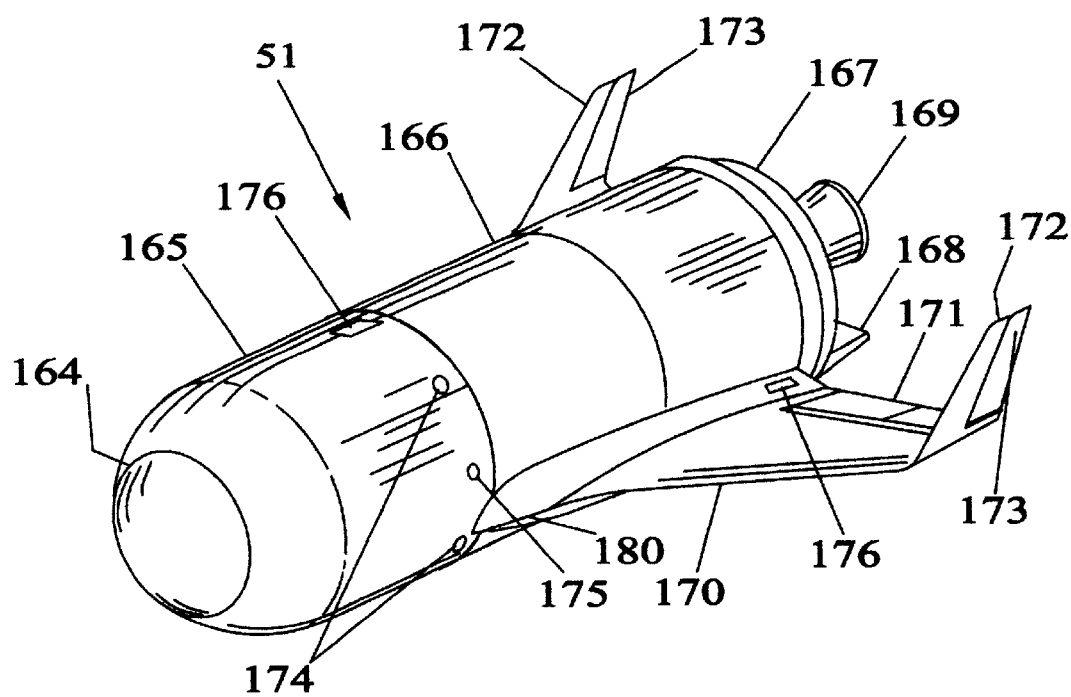
FIG. 19 illustrates a top perspective view of the reusable spacecraft.

Referring to FIG. 19, a top perspective view of the reusable spacecraft (51) illustrates the circular cross-section of the fuselage components (164), (165), (166) and (167) and the lower fuselage fairing (180). Also shown are the wing (170) and elevons (171), vertical tails (172) and rudders (173), rocket engine (169), heat shield (168), vents (176), pitch and roll attitude control thruster (174) and yaw attitude control thruster (175).

Figure 20:
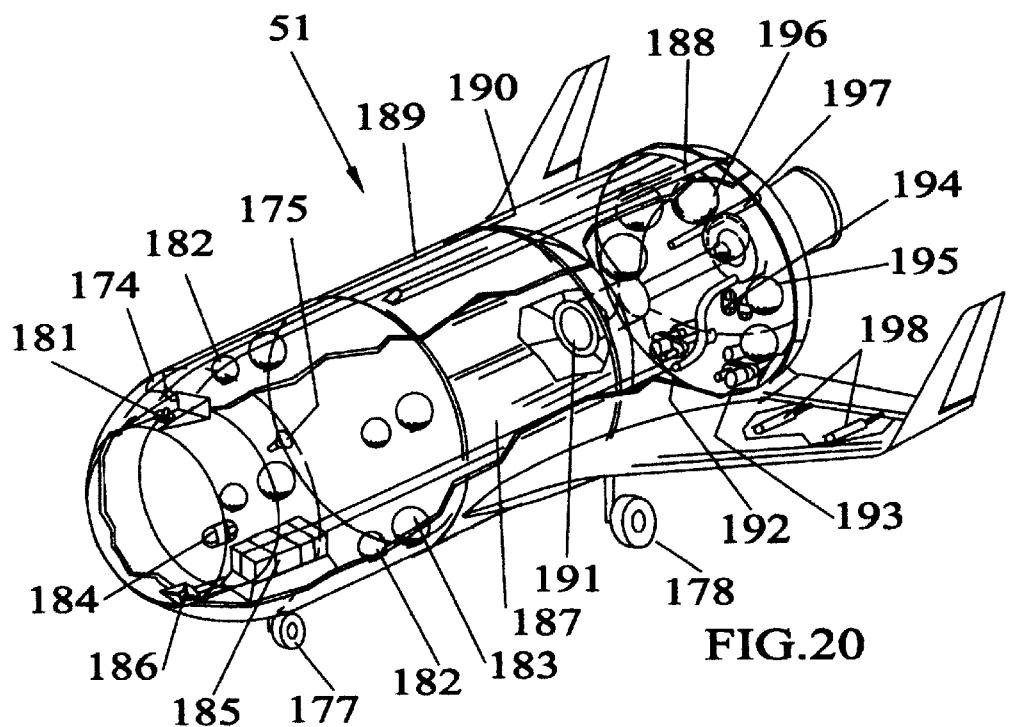
FIG. 20 illustrates a top perspective view of the internal elements of the reusable spacecraft.

Referring to FIG. 20, the reusable spacecraft (51) internal components are illustrated on a ghosted top perspective. The turret that is the payload mount and spherical segment fairing (164) is hinged top and bottom and power driven (181) to rotate 180 degrees. The attitude control thrusters (174) and (175) oxidizer propellant tanks (182) and fuel tanks (183) are located in the forebody (165) with the auxiliary landing gear (177) and its extension accumulator (184), the avionics and its environmental control system (185) and the payload umbilical (186). Along the bottom centerline of the main fuselage (166) is the systems conduit (187). Along the top centerline is the fuel vent (188). The forward portion of the main fuselage (166) is the fuel tank (189) and the aft portion is the oxidizer tank (190). At the centerline is the fuel line (191) through the oxidizer tank (190). The oxidizer line (192) feeds from the bottom of the concave bulkhead to the centerline rocket engine (169). Within the aft fuselage closeout are the primary power units with hydraulic systems and electric generators (193), hydraulic reservoirs (194), propellant tanks (195), propellant tanks pressurant tanks (196) and oxidizer vent (197). In the wing (170) are flight control actuators (198).

Figure 21:
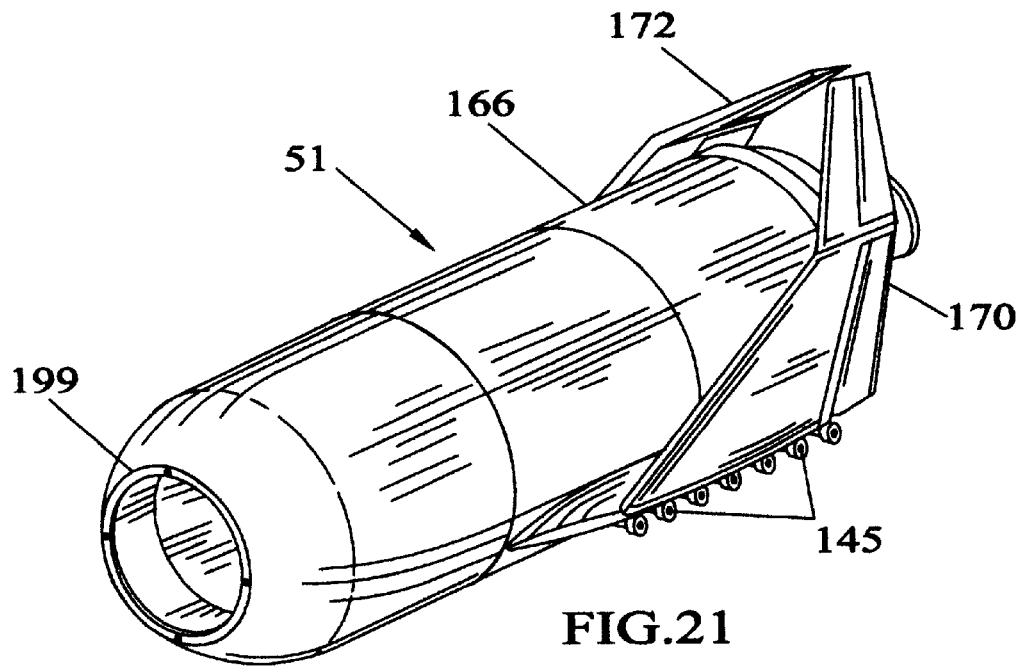
FIG. 21 illustrates a top perspective view of the reusable spacecraft in the carriage configuration.

Referring to FIG. 21, a top perspective view of the reusable spacecraft (51) in the carriage position for use abroad the aerospacecraft (50) illustrates the payload mount facing forward (199), the wing (170) with slanted vertical tails (172) folded against the fuselage (166) exposing the rollers (145) for installation in the aerospacecraft (50) on rails (144).

Figure 22:
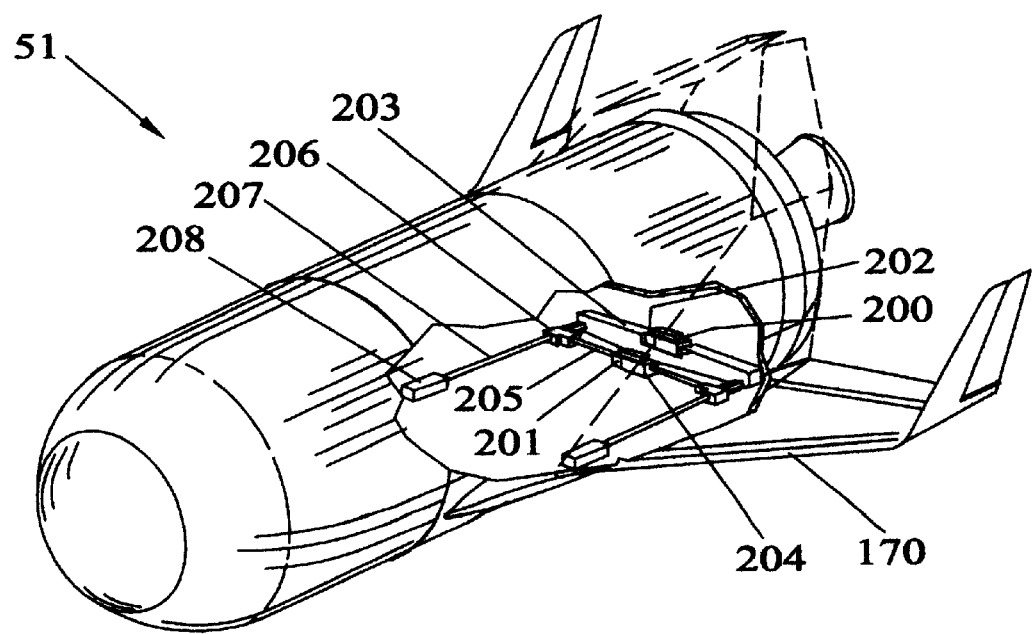
FIG. 22 illustrates a top perspective view of the reusable spacecraft wing deployment system.

Referring to FIG. 22, a partially ghosted top perspective illustrates the wing (170) extension mechanism (200) and wing down lock mechanism (201). The extension mechanism (200) consists of a single linear actuated bell crank (202) with pull rods (203) to extend the wing (170). The wing down lock mechanism (201) employs a single motor (204) with drive shafts (205) that turn a worm and gear unit (206) on each side that in turn rotate torque tubes (207) to front and rear wing (170) spars where spline translating threaded taper pins (208) lock and draw down the wing seals.

Figure 23:
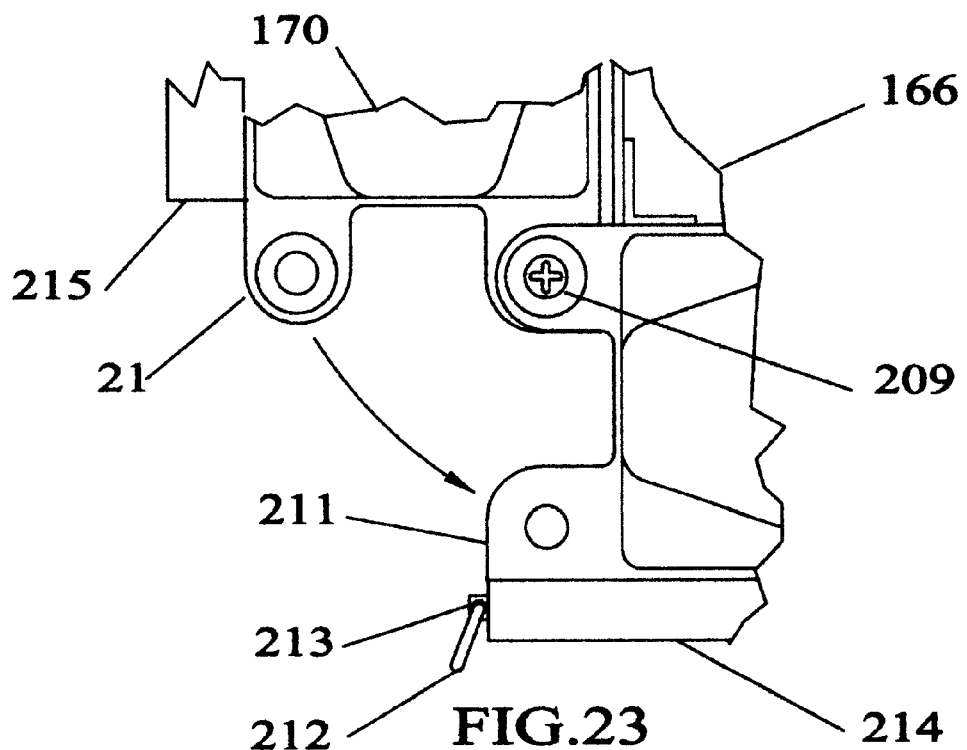
FIG. 23 illustrates a cross-section view of the reusable spacecraft wing re-entry seal system.

Referring to FIG. 23, a cross-section of the reusable spacecraft wing (170) at a spar joint is illustrated in the folded position. The upper joint (209) acts as a hinge. The lower joint consists of a lug (210) and clevis (211) which have matched tapered holes for the tapered pins (208). The tapered pins (208) lock the extended wing and deflect the ceramic matrix composite vent seal (212) and compress the flexible backup seal (213). The seals are mounted on the fuselage (166), thermal protection tiles (214) and wing (170) thermal protection tiles (215).

Figure 24:
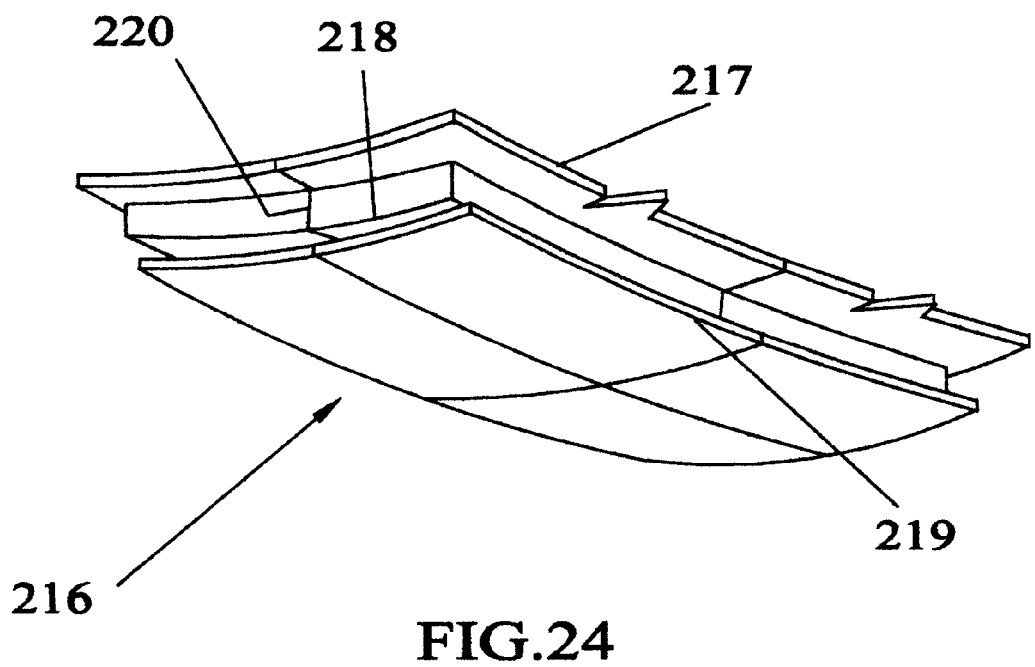
FIG. 24 illustrates an external perspective view of the thermal protection system.

Referring to FIG. 24, an external perspective of a typical lower surface area covered with a thermal protection system (216) is illustrated. The thermal protection system is applied to the spherical segment nose (164), the forebody (165), the bottom of the fuselage (166), lower fuselage fairing (180), rocket nozzle heat shield (168), wing (170) bottom and upper leading edge and on both sides of the vertical tails of the reusable spacecraft (51). The airframe cover (217) has retisic ceramic foam (218) tiles bonded with a ceramic adhesive. Face sheets of ceramic matrix composite (219) form the outer surface. They are arranged to overlap the foam core splice joints (220) and are also bonded with a ceramic adhesive.

Figure 25:
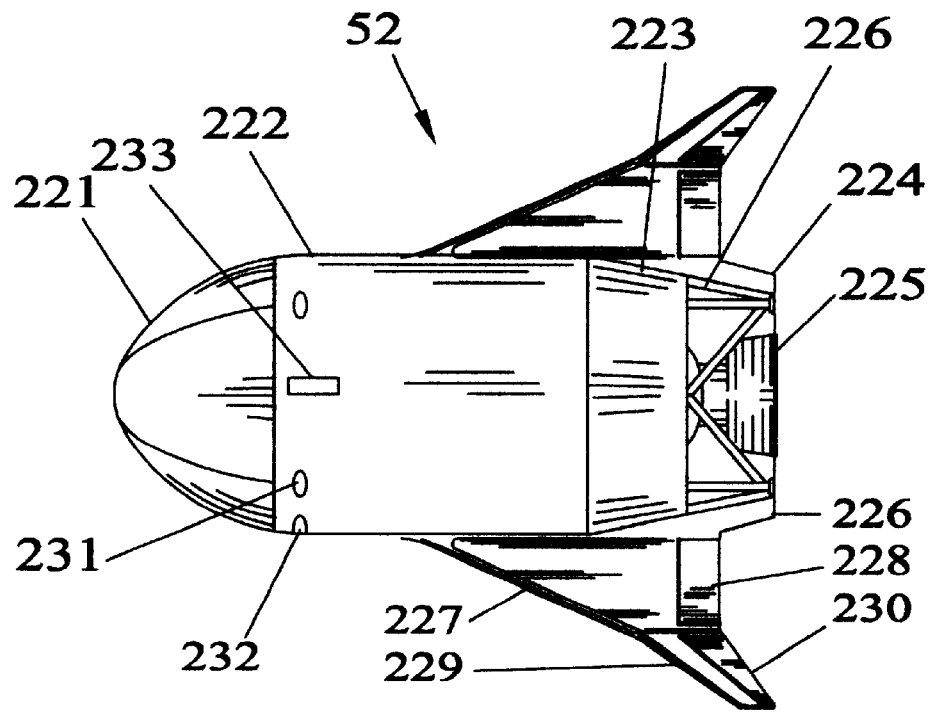
FIG. 25 illustrates a top planform view of the reusable orbit transfercraft.

Referring to FIG. 25, the reusable orbit transfercraft (52) is shown in a top planform view in the recovery configuration. The forward fuselage consists of four doors (221) that cover the payload mount during recovery operations. The main fuselage (222) contains the propellant tanks and subsystems. The aft fuselage closeout (223) is a heat shield protecting the internal systems during re-entry. The lower panel is a heat shield (224) for the rocket engine (225) nozzle. There is an external truss (226) for mounting to the reusable spacecraft (51). The wings (227) are highly swept aft with trailing edge elevons (228) for aerodynamic pitch and roll control. A slanted vertical tail (229) is mounted on each wing (227) tip. The dihedral angle of the slanted vertical tail (229) is set to maximize wing (227) and vertical tail (229) areas while minimizing carriage volume in the aerospacecraft (50). The vertical tails (229) provide directional stability and trailing edge rudders (230) provide directional control. Exo-atmospheric attitude is controlled by thrusters for pitch and roll (231) and yaw (232). The airframe internal pressure, excluding propellant systems, is controlled by vents (233).

Figure 26:
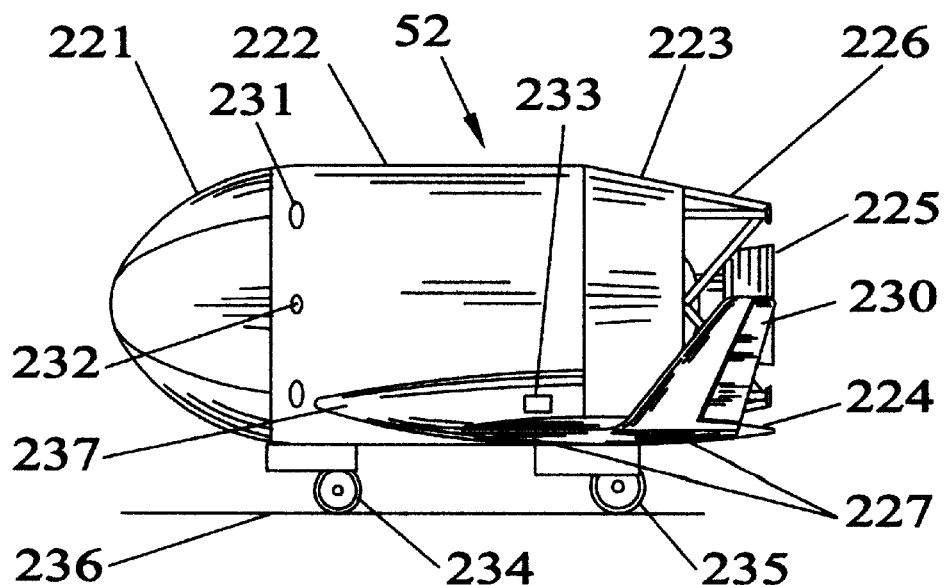
FIG. 26 illustrates a side elevation view of the reusable orbit transfercraft.

Referring to FIG. 26, the reusable orbit transfercraft (52) is shown in a side elevation view in the recovery configuration. The auxiliary landing gear (234) and main landing gear (235) are shown in the extended position for ground handling and landing. The reusable orbit transfercraft is shown standing on the static ground line (236). The fairing (237) on the lower fuselage (222) sides house the wing attachment structure and extension and lock mechanisms and main landing gear (235). Shown on the forebody portion of the fuselage (222) are the attitude control thrusters (231) and (232) and vents (233), also in the fairing (237). Also shown are the payload mount cover doors (221), closeout heat shield (223), rocket engine (225), heat shield (224), wing (227), vertical tail (229) and rudder (230).

Figure 27:
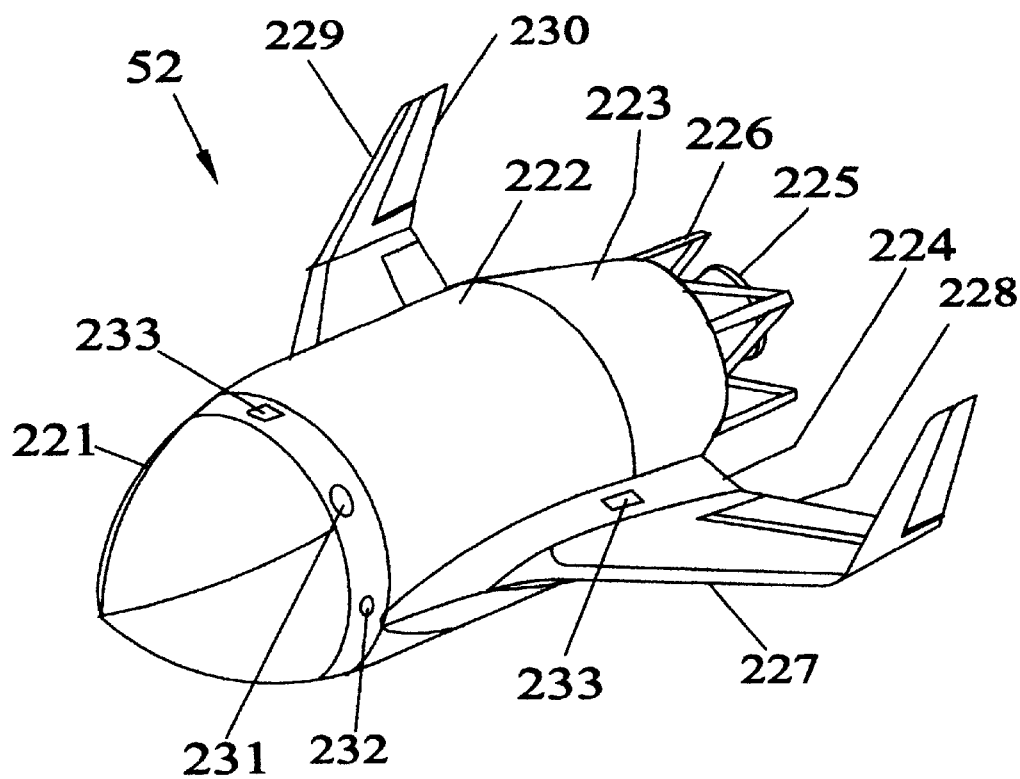
FIG. 27 illustrates a top perspective view of the reusable orbit transfercraft.

Referring to FIG. 27, a top perspective view of the reusable orbit transfercraft (52) illustrates the circular cross-section of the fuselage (222), closeout heat shield (223) and the lower fuselage fairing (237). Also shown are the wings (227), elevons (228), vertical tails (229), rudders (230), rocket engine (225), mounting truss (226), heat shield (224), vents (233), pitch and roll attitude control thrusters (231) and yaw attitude control thrusters (232). The thermal protection treatment, wing extension and lock mechanism are like the reusable spacecraft.

Figure 28:
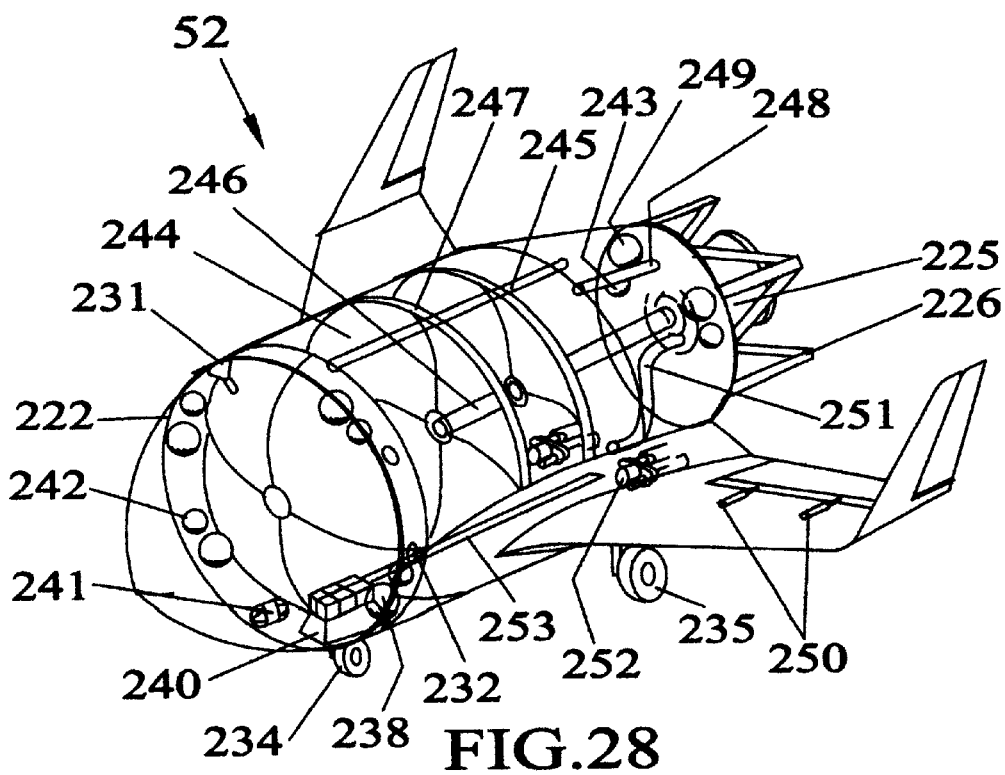
FIG. 28 illustrates a top perspective view of the internal elements of the reusable orbit transfercraft.

Referring to FIG. 28, the reusable orbit transfercraft (52) internal components are illustrated on a ghosted top perspective. The payload umbilical (239), the avionics and its environmental control system (240), auxiliary landing gear (234) and its extension accumulator (241), attitude system oxidizer tanks (242) and fuel tanks (238), pitch and roll attitude control thrusters (231) and yaw attitude control thrusters (232) are located in the forward fuselage (222). The intermediate fuselage (222) is the fuel tank (244). The aft fuselage (222) is the oxidizer tank (247). Contained in the fuselage (222) are the systems conduit (253), fuel vent (245), oxidizer vent (248), fuel line (246) and oxidizer line (251). The closeout heat shield contains the primary power units with hydraulics systems and electrical generators (252), propellant tanks (243), and propellant tanks pressurant tanks (249). In the wing are flight control actuators (250). In the lower fuselage fairing (237) are the main landing gear (235). Also shown are the rocket engine (225) and mount truss (226).

Figure 29:
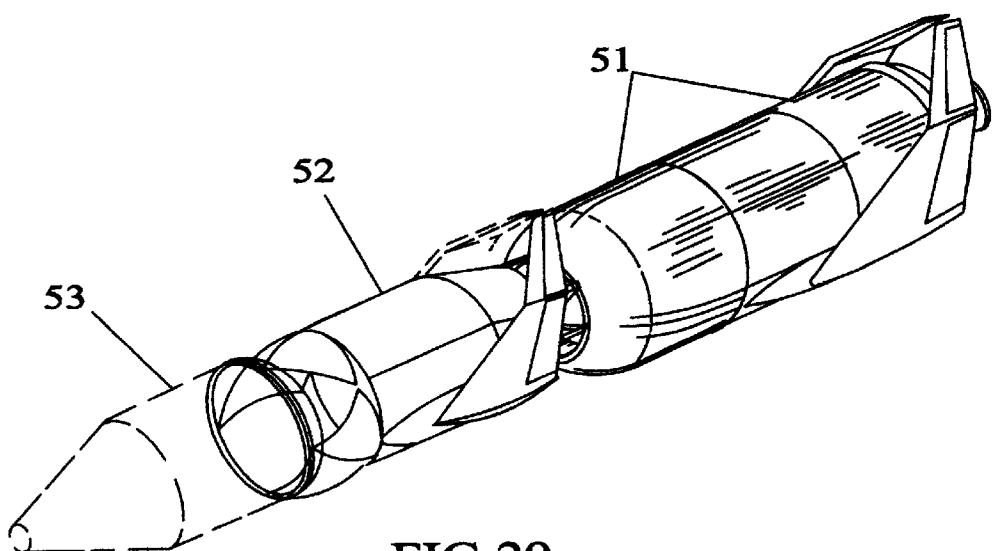
FIG. 29 illustrates a top perspective view of the reusable orbit transfercraft mated to the reusable spacecraft, both in the carriage configuration, and a payload clearance envelope.

Referring to FIG. 29, illustrates the top perspective view of the reusable spacecraft (51), the reusable orbit transfercraft (52) and payload clearance envelope (53) in the carriage configuration for the preferred embodiment primary mission.

Figure 30:
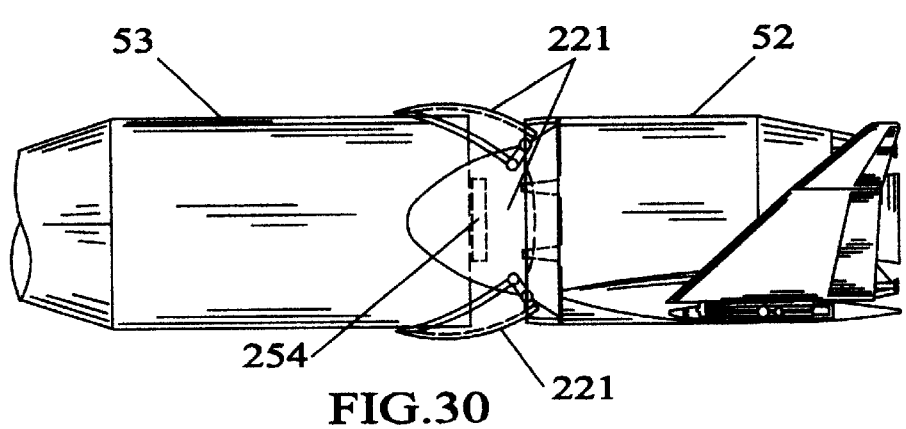
FIG. 30 illustrates a side elevation view of the reusable orbit transfercraft in the carriage configuration with a payload envelope attached.

Referring to FIG. 30, a side elevation view illustrates the reusable orbit transfercraft (52) in the carriage configuration with a payload (53) attached to a truncated cone mount structure (254). The payload cover doors (221) are in the open position.

Figure 31:
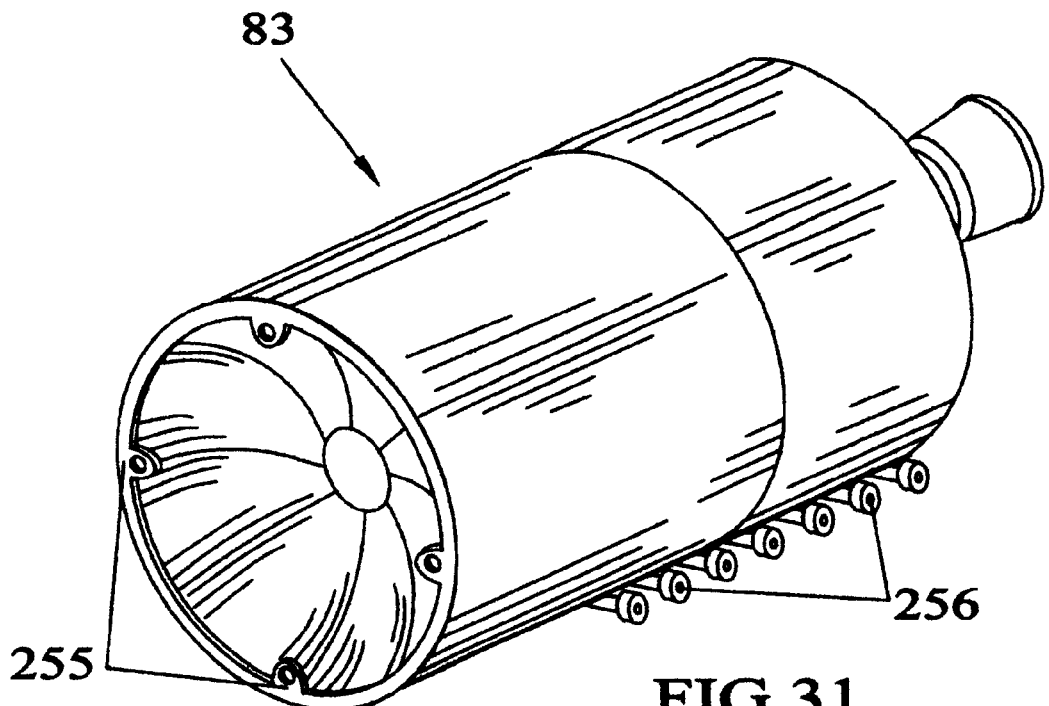
FIG. 31 illustrates a top perspective view of an expendable second stage.

Referring to FIG. 31, a top perspective view illustrates an expendable second stage (83). This stage is used for placing large mass payloads directly in geosynchronous orbit. The expendable second stage (83) trades the reusable spacecraft (51) reusable features volume and weight for added propellant at a greater mass fraction for increased performance. It has an interface (255) for mounting an expendable third stage (82) and rollers (256) for installation in the aerospacecraft (50).

Figure 32:
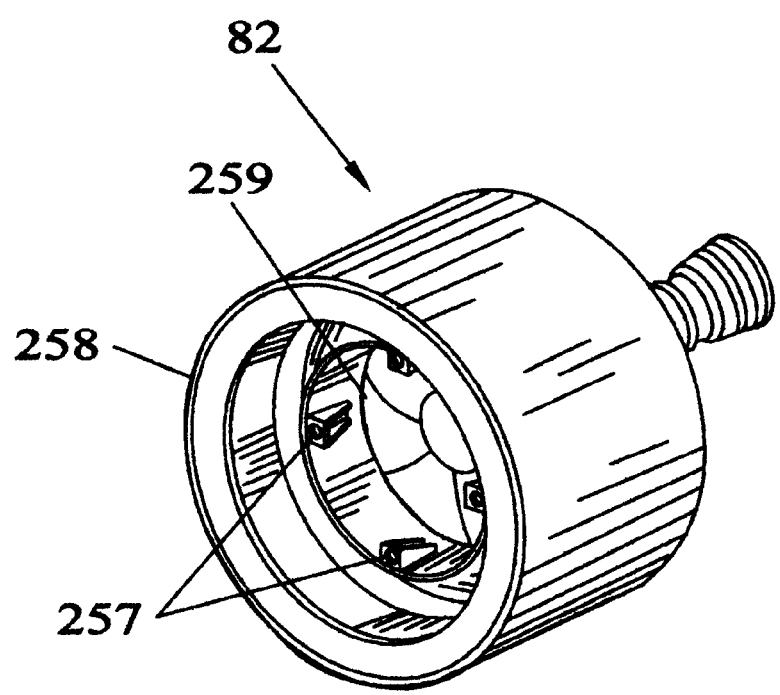
FIG. 32 illustrates a top perspective view of an expendable third stage.

Referring to FIG. 32, a top perspective view illustrates an expendable third stage (82). This stage is also used to place a large mass payload directly to geosynchronous orbit. The expendable third stage (82) trades the reusable orbit transfercraft (52) reusable features volume and weight for added propellant at a greater mass fraction for increased performance. It has a payload interface (257) recessed in a toroidal fuel tank (258) and forward of a lenticular oxidizer tank (259).

Figure 33:
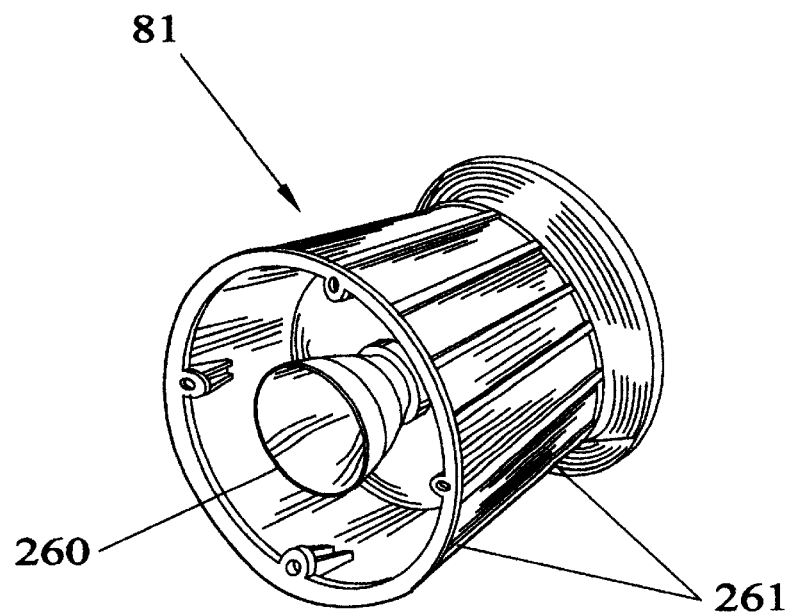
FIG. 33 illustrates a top rear perspective view of an expendable fourth stage.

Referring to FIG. 33, a top rear perspective view illustrates an expendable fourth stage (81). This stage is used in conjunction with the reusable spacecraft (51) and reusable orbit transfercraft (52) to place low mass payload in interplanetary flight. The expendable fourth stage (81) consists of an available solid rocket booster (260) and an interstage (261).

Figure 34:
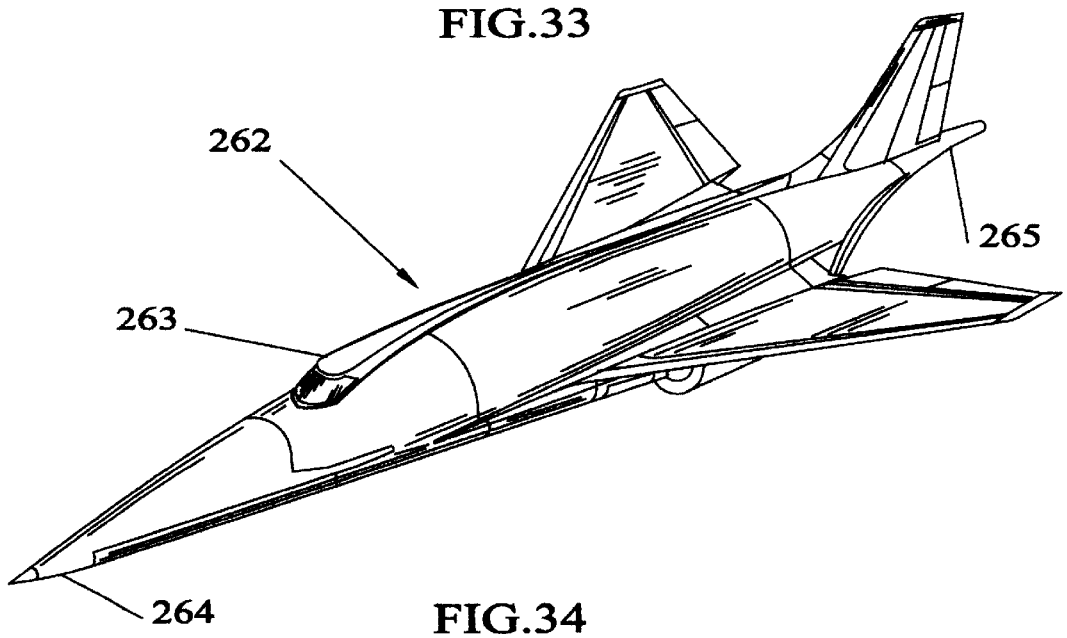
FIG. 34 illustrates a top perspective view of a manned hypersonic transport embodiment of the aerospacecraft.

Referring to FIG. 34, a top perspective of a manned hypersonic transport (262) version of the aerospacecraft (50) is illustrated. A crew module (263) is added. The payload bay doors (264) are tailored for the intended cargo. The auxiliary ascent rocket system is deleted and faired (265) and the oxidizer tankage is converted to fuel. Primary structure and tooling, ejector ramjet propulsion and subsystem are essentially the same as the aerospacecraft (50).

While the invention has been particularly shown and described with respect to the illustrated and preferred embodiments thereof, it will be understood by those skilled in the art that the foregoing and other changes in form and details may be made therein without departing from the spirit and scope of the invention.

We claim:
1. An aerospacecraft comprising:
 a) a fuselage, a pair of wings with a plurality of control surface and a tail with a rudder;
 b) the fuselage comprising:
  i) a conic curve shape for an upper fuselage from a nose end to a tail end;
  ii) a straight line conic shape for a lower fuselage from the nose end to an engine nacelle; the engine nacelle aft of a plurality of inlets having a constant semicircular cross section to a plurality of engine exhaust nozzles; and a lower aft fuselage having a decreasing concave conic shape to the tail end;
  iii) a maximum cross section dimension of the fuselage is at the wing root leading edge and is such to enclose a payload bay; and access to the payload bay is by means of two clam shell doors from the nose end aft being a payload bay hood and a payload bay ramp which may be opened to receive a payload, closed for flight operations and opened for payload removal;
 c) the wings comprising:
  i) a pair of wing strakes added to the fuselage at a centerline to accommodate the wings; and
  ii) each wing leading edge is swept back from a strake junction with each wing outer portion curved back to a wing tip;
 d) the tail comprising:
  i) the tail mounted slightly forward of the tail end and a tail leading edge swept back from a tail root; and
  ii) a tail outer portion curved back to a tail tip;
 e) an attitude control system with a plurality of attitude control rockets mounted in the payload bay hood and the wing tips with supporting a plurality of position fuel tanks;
 f) a nose gear and a set of mid section landing gears;
 g) an integral ascent tank contained in the fuselage aft of the payload pay, a plurality of auxiliary ascent tanks, and a cradle tank;
 h) an air liquification unit which receives air from the air liquification inlets connected by ducting contained in the engine nacelle and which liquifies the air for storage in a plurality of liquid air tanks;
 i) an avionics system, a plurality of helium tanks and a plurality of primary power propellant units; and
 j) a plurality of ejector ramjet engines mounted in the engine nacelle which receive ambient air from the engine nacelle inlets connected by engine inlet ducts.
2. The aerospacecraft as in claim 1 wherein:
 a) a pair of boost ascent rocket engines are mounted in the tail end which are fueled by a boost liquid hydrogen tank and a boost liquid oxygen tank;

b) a catapult and a pair of payload rails mounted in the payload bay;
c) a reusable spacecraft which may be placed in the payload bay on the payload rails comprising;
  i) a rocket engine with a liquid hydrogen tank and a liquid oxygen tank attached and a plurality of propellant pressurant helium tanks;
  ii) an equipment section, a main body, an aft equipment section, a RSC tail end with an engine cowl and a rotatable nose;
  iii) the main body in a lower rear surface having a fairing from the approximate mid point of the main body to an engine nozzle reentry shield at the RSC tail end;
  iv) a pair of RSC wings rotatably attached to the fairing and having a slanted tail attached to each wing with each leading edge tapered where each RSC wing has a control elevon and each tail has RSC rudder;
  v) a RSC nose landing gear, a pair of RSC main landing gear and a plurality of axle rollers which are exposed when the RSC wings are folded such that the axle rollers may rest on the payload rails;
  vi) an attitude control equipment system including a plurality of RSC attitude control thrusters; a guidance, navigation and control equipment; and a plurality of primary power units; and
  vii) a payload mount with a payload adapter attached to the rotatable nose and payload interface equipment.
3. The aerospacecraft as in claim 1 wherein:
a reusable orbit transfercraft is attached as the payload to the reusable spacecraft and the reusable orbit transfercraft comprising:
a) an orbit rocket engine with a ROC liquid hydrogen tank and a ROC liquid oxygen tank attached and a plurality of ROC propellant pressurant helium tanks;
  ii) a ROC equipment section, a ROC main body, a ROC aft equipment section, a ROC tail end with a ROC engine cowl fairing, a tubular truss and a ROC nose interface fairing with a clam shell nose which may be opened and closed;
  iii) the ROC main body in a ROC lower rear surface having a ROC fairing from the approximate mid point of the ROC main body to a ROC engine nozzle reentry shield at the ROC tail end;
  iv) a pair if ROC wings rotatably attached to the ROC fairing and having a ROC slanted tail attached to each ROC wing with each ROC wing and ROC tail leading edge tapered where each ROC wing has a ROC control elevon and each ROC tail has a ROC rudder;
  v) a ROC nose landing gear and a pair of ROC main landing gear;
  vi) a ROC attitude control equipment system including a plurality of ROC attitude control thrusters; a ROC guidance, navigation and control equipment; and a plurality of ROC primary power units;
  vii) a ROC payload interface equipment with ROC payload mounting equipment in the nose interface fairing and the clam shell nose with the clam shell nose elements open.

4. The aerospacecraft as in claim 2 wherein the third stage element is a human payload stage.

5. The aerospacecraft as in claim 3 wherein there is an expendable fourth stage to boost the payload.

6. The aerospacecraft as in claim 2 wherein there is an expendable third stage to boost the payload.

7. The aerospacecraft as in claim 1 wherein there is an expendable second stage and an expendable third stage mounted therein for delivery of the payload.

8. The aerospacecraft as in claim 1 wherein there is provision for a pilot.

* * * * *